US010565726B2

(12) United States Patent
Lindner et al.

(10) Patent No.: US 10,565,726 B2
(45) Date of Patent: Feb. 18, 2020

(54) POSE ESTIMATION USING MULTIPLE CAMERAS

(71) Applicant: QUALCOMM Incorporated, San Diego, CA (US)

(72) Inventors: Albrecht Johannes Lindner, La Jolla, CA (US); Kalin Mitkov Atanassov, San Diego, CA (US); James Wilson Nash, San Diego, CA (US); Hasib Siddiqui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 15/640,821

(22) Filed: Jul. 3, 2017

(65) Prior Publication Data

US 2019/0005678 A1 Jan. 3, 2019

(51) Int. Cl.
*G06T 7/73* (2017.01)
(52) U.S. Cl.
CPC ...... *G06T 7/74* (2017.01); *G06T 2207/20228* (2013.01); *G06T 2207/30244* (2013.01)
(58) Field of Classification Search
None
See application file for complete search history.

(56) References Cited

U.S. PATENT DOCUMENTS

| | | | |
|---|---|---|---|
| 7,671,916 B2 | 3/2010 | Hashimoto | |
| 8,553,935 B2 * | 10/2013 | Mandella | G01B 21/04 382/103 |
| 9,098,905 B2 | 8/2015 | Rivlin et al. | |
| 10,037,474 B2 * | 7/2018 | Holz | G06K 9/00355 |
| 2015/0071524 A1 | 3/2015 | Lee | |
| 2015/0209673 A1 | 7/2015 | Martini | |
| 2016/0098095 A1 * | 4/2016 | Gonzalez-Banos | G06F 3/017 345/156 |
| 2018/0286065 A1 * | 10/2018 | Knorr | G06T 7/277 |

OTHER PUBLICATIONS

Sandro Esquivel, "Eye-to-Eye Calibration," Doctoral Dissertation, University of Kiel, 2015 (Year: 2015).*
Ragab M.E., et al., "Multiple Nonoverlapping Camera Pose Estimation," Proceedings of 2010 IEEE 17th International Conference on Image Processing, Sep. 26-29, 2010, pp. 3253-3256.

* cited by examiner

*Primary Examiner* — Soo Shin
(74) *Attorney, Agent, or Firm* — Moore Intellectual Property Law, PLLC

(57) ABSTRACT

A device includes a first camera and a processor configured to detect one or more first keypoints within a first image captured by the first camera at a first time, detect one or more second keypoints within a second image captured by a second camera at the first time, and detect the one or more first keypoints within a third image captured by the first camera at a second time. The processor is configured to determine a pose estimation based on coordinates of the one or more first keypoints of the first image relative to a common coordinate system, coordinates of the one or more second keypoints of the second image relative to the common coordinate system, and coordinates of the one or more first keypoints of the third image relative to the common coordinate system. The first coordinate system is different than the common coordinate system.

27 Claims, 7 Drawing Sheets

POSE ESTIMATION USING MULTIPLE CAMERAS

I. FIELD

The present disclosure is generally related to pose estimation.

II. DESCRIPTION OF RELATED ART

Advances in technology have resulted in smaller and more powerful computing devices. For example, a variety of portable personal computing devices, including wireless telephones such as mobile and smart phones, tablets and laptop computers, are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

These devices may be configured to determine a relative pose estimation based on movement of keypoints between image frames. A number of keypoints available from a single camera may be insufficient to solve for the relative pose estimation, such as a pose estimation of a device or of a single camera of the device. For example, pose estimation may be determined using at least a particular number of keypoints (e.g., five keypoints) and the particular number of keypoints (or more than the particular number) may not be identified or available from images from the single camera. Additionally, it may be difficult to determine whether movement of the device between capture of the image frames is a result of rotation or translation of the device.

III. SUMMARY

In a particular example, a device includes a first camera and a processor. The processor is configured to detect one or more first keypoints within a first image captured by the first camera at a first time, to detect one or more second keypoints within a second image captured by a second camera at the first time, and to detect the one or more first keypoints within a third image captured by the first camera at a second time. The processor is additionally configured to determine coordinates of the one or more first keypoints of the first image relative to a first coordinate system. The processor is additionally configured to determine a pose estimation based on coordinates of the one or more first keypoints of the first image relative to a common coordinate system, based on coordinates of the one or more second keypoints of the second image relative to the common coordinate system, and based on coordinates of the one or more first keypoints of the third image relative to the common coordinate system. The first coordinate system is different than the common coordinate system.

In a particular example, a method of determining a pose estimation includes detecting one or more first keypoints within a first image captured by a first camera at a first time. The method additionally includes detecting one or more second keypoints within a second image captured from a second camera at the first time. The method additionally includes detecting the one or more first keypoints within a third image captured by the first camera at second first time. The method additionally includes transforming the one or more first keypoints of the first image from a first coordinate system associated with the first camera or the first image to a second coordinate system. The second coordinate system is associated with the second camera, the second image, or a device that includes the first camera, the second camera, or both the first camera and the second camera. The method additionally includes determining a pose estimation based on the transformed one or more first keypoints, the one or more second keypoints of the second image, and the one or more first keypoints of the third image.

In a particular example, an apparatus includes means for detecting one or more first keypoints within a first image captured by first means for capturing images. The apparatus additionally includes means for detecting one or more second keypoints within a second image captured by second means for capturing images. The apparatus additionally includes means for detecting the one or more first keypoints within a third image captured by the first means for capturing images. The apparatus additionally includes means for determining coordinates of the one or more first keypoints of the first image relative to a first coordinate system. The apparatus additionally includes means for determining a pose estimation based on coordinates of the one or more first keypoints of the first image relative to a common coordinate system, coordinates of the one or more second keypoints of the second image relative to the common coordinate system, and coordinates of the one or more first keypoints of the third image relative to the common coordinate system. The common coordinate system is different than the first coordinate system.

In a particular example, a computer-readable medium storing instructions that, when executed by a processor, cause the processor to perform operations including detecting one or more first keypoints within a first image captured by a first camera at a first time. The operations additionally include detecting one or more second keypoints within a second image captured from a second camera at the first time. The operations additionally include detecting the one or more first keypoints within a third image captured by the first camera at a second time. The operations additionally include transforming the one or more first keypoints from a first coordinate system associated with the first camera or the first image to a second coordinate system. The second coordinate system is associated with the second camera, the second image, or a device that includes the first camera, the second camera, or both the first camera and the second camera. The operations additionally include determining a pose estimation based on the transformed one or more first keypoints, the one or more second keypoints of the second image, and the one or more first keypoints of the third image.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
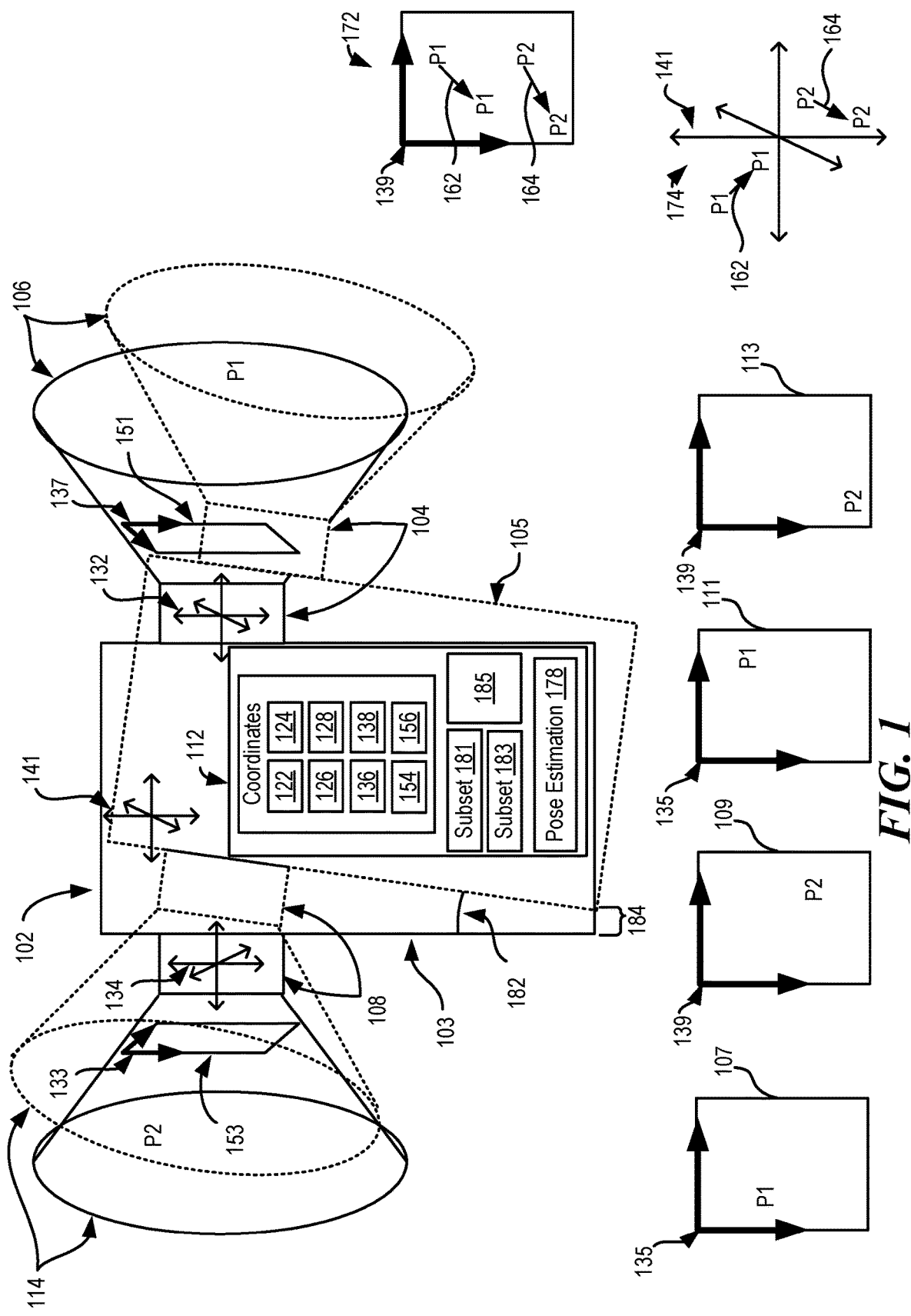
FIG. 1 is a block diagram of a particular illustrative example of a device that is configured to determine a pose estimation based on a first image of a first camera and a second image of a second camera.

The present disclosure describes examples of determining a pose estimation (e.g., a relative pose estimation) based on perceived movement of one or more keypoints from images captured by a first camera and one or more keypoints from images captured by a second camera. For example, one or more keypoints from images of the first camera, one or more keypoints from images of the second camera, or both may be transformed to a common coordinate system (e.g., the same coordinate system). Perceived movement (e.g., relative displacement) between one or more keypoints of a first image of the first camera and a second image of the first camera is then determined based on the common coordinate system. Additionally, perceived movement (e.g., relative displacement) between one or more keypoints of a first image of the second camera and a second image of the second camera is then determined based on the common coordinate system. Determining the pose estimation based on perceived movement of keypoints from different cameras relative to the same coordinate system may enable solving for pose when the one or more keypoints from a single camera are insufficient to solve for pose. As an illustrative example, a system may use a minimum number of keypoint correspondences (e.g., five keypoint correspondences) between frames to solve for pose estimation. In this example, the one or more keypoints from images from the first camera may include one keypoint and that one keypoint may not be present in the images from the second camera. In this example, the one or more keypoints from the second camera may include four keypoints and the four keypoints may not be present in the images from the first camera. Because the system uses five keypoint correspondences to solve for pose, the one or more keypoints from the first camera individually, or the one or more second keypoints from the second camera individually, may be insufficient to determine the pose estimation. To address the insufficient number of keypoints from the individual cameras, the one or more keypoints from the first camera may be transformed to the same coordinate system as the one or more keypoints from the second camera. Thus, a single coordinate system may therefore include five keypoint correspondences, which may be sufficient in this example to solve for relative rotation and translation between frames.

The pose estimation includes a rotation estimation and a translation estimation. In some implementations, the system may use "distant" keypoints (e.g., keypoints that satisfy a distance criterion) to solve for the rotation. Because perceived movement of "distant" keypoints is more representative of rotation movement than translation movement, using "distant" keypoints to solve for the rotation may enable a more accurate determination of the rotation. Using "distant" keypoints to solve for rotation will tend to reduce a number of detected keypoints that are available to solve for rotation. Reducing the number of detected keypoints that are available to solve for rotation may increase occurrence of the number of keypoints from a single camera being insufficient to solve for pose relative to systems that do not use only "distant" keypoints to solve for rotation. When the system uses a minimum number of keypoint correspondences to solve for pose, using keypoints from different cameras to satisfy the minimum number of keypoint correspondences may enable the system to solve for pose even when the number of keypoints from a single camera are insufficient to solve for pose based on the pool of available keypoints being reduced due to using "distant" keypoints to solve for rotation.

Referring to FIG. 1, a particular illustrative example of a device 102 at a first position 103 of the device 102 at a first time and at a second position 105 (indicated by dashed lines) of the device 102 at a second time is disclosed. The device 102 includes a first camera 104 and a second camera 108.

The first camera 104 has a first field of view 106. The first camera 104 is configured to capture an image 107 (e.g., a first image) at the first time and an image 111 (e.g., a third image) at the second time. The first image 107 and the third image 111 may each include one or more first keypoints P1. The second camera 108 has a second field of view 114. The second camera 108 is configured to capture an image 109 (e.g., a second image) at the first time and an image 113 (e.g., a fourth image) at the second time. The second image 109 and the fourth image 113 may each include one or more second keypoints P2. Although the device 102 is illustrated as including the second camera 108, in other examples, the second camera 108 is remote (e.g., detached) from the device 102.

In some examples, the first camera 104 faces in a direction substantially opposite to the direction in which the second camera 108 faces. For example, the first camera 104 and the second camera 108 may, respectively, correspond to forward and rear facing cameras of a mobile phone. In other examples, not shown, the first camera 104 and the second camera 108 may both correspond to forward facing cameras of a device, the first camera 104 and the second camera 108 may both correspond to rear facing cameras of a device, or the first camera 104 and the second camera 108 may face other directions relative to one another of a device.

The field of view 106 of the first camera 104 is different from the field of view 114 of the second camera 108 such that the first and third images 107 and 111 from the first camera 104 do not include the same keypoints as the second and fourth images 109 and 113 from the second camera 108. To illustrate, the first and third images 107 and 111 from the first camera 104 may include the one or more first keypoints P1 (that are not in a field of view 114 of the second camera 108), and the second and fourth images 109 and 113 from the second camera 108 may include the one or more second keypoints P2 (that are not in the field of view 106 of the first camera 104). In other implementations, the fields of view 106 and 114 may be at least partially overlapping and may include some of the same keypoints in the overlapping portions.

The device 102 includes a processor 112. The processor 112 is configured to detect the one or more first keypoints P1 within the first image 107 captured by the first camera 104 at the first time and to detect the one or more second keypoints P2 within the second image 109 captured by the second camera 108 at the first time. Alternatively or additionally, the processor 112 is configured to detect the one or more first keypoints P1 within the third image 111 captured by the first camera 104 at the second time and to detect the one or more second keypoints P2 within the fourth image 113 captured by the second camera 108 at the second time.

The processor 112 is additionally configured to determine coordinates 122 of the one or more first keypoints P1 based on the first image 107. The processor 112 may additionally be configured to determine coordinates 126 of the one or more first keypoints P1 based on the third image 111. The coordinates 122 and 126 are determined relative to a first coordinate system associated with an image space of the first camera 104. The first coordinate system may be local to (e.g., may be tied to or may follow or move with) the first camera 104 or images generated by the first camera 104. Thus, the coordinates 122 may be represented in a same coordinate system as the coordinates 126 even when the first camera 104 moves (e.g., rotationally, vertically, horizontally, etc.) between the first time and the second time. For example, the first coordinate system may correspond to a camera coordinate system 132 of the first camera 104, an image plane coordinate system 137 of the first camera 104, or a pixel coordinate system 135 of images generated by the first camera 104.

To illustrate, the first coordinate system may correspond to the camera coordinate system 132. In this example, the coordinates 122 may represent a position of the one or more first keypoints P1 relative to the camera coordinate system 132 associated with the first camera 104 at the first time. As another example, the coordinates 126 may represent a position of the one or more first keypoints P1 relative to the camera coordinate system 132 associated with the first camera 104 at the second time. Because the camera coordinate system 132 is local to (e.g., moves with) the first camera 104 or images generated by the first camera 104, the coordinates 122 and the coordinates 126 may represent the one or more first keypoints P1 relative to the same coordinate system—the camera coordinate system 132—even when a three-dimensional position, orientation, or both, of the first camera 104 changes between the first time and the second time.

As another example, the first coordinate system may correspond to the image plane coordinate system 137. In this example, the coordinates 122 may represent a position of the one or more keypoints P1 relative to the image plane coordinate system 137 associated with the first camera 104 at the first time. As another example, the coordinates 126 may represent a position of the one or more first keypoints P1 relative to the image plane coordinate system 137 associated with the first camera 104 at the second time. Because the image plane coordinate system 137 is local to (e.g., moves with) the first camera 104 or images generated by the first camera 104, the coordinates 122 and the coordinates 126 may represent the one or more first keypoints P1 relative to the same coordinate system—the image plane coordinate system 137—even when a three-dimensional position, orientation, or both, of the first camera 104 changes between the first time and the second time.

As another example, the first coordinate system may correspond to the pixel coordinate system 135. In this example, the coordinates 122 may represent a position of the one or more keypoints P1 relative to the pixel coordinate system 135 associated with the first camera 104 at the first time. As another example, the coordinates 126 may represent a position of the one or more keypoints P1 relative to the pixel coordinate system 135 associated with the first camera 104 at the second time. Because the pixel coordinate system 135 is local to (e.g., moves with) the first camera 104 or images generated by the first camera 104, the coordinates 122 and the coordinates 126 may represent the one or more first keypoints P1 relative to the same coordinate system—the pixel coordinate system 135—even when a three-dimensional position, orientation, or both, of the first camera 104 changes between the first time and the second time.

Because the first coordinate system is local to the first camera 104 or images generated by the first camera 104, when the first camera 104 is in a different position, orientation, or both at the second time than at the first time, the coordinates 122 may be different from the coordinates 126 even if the one or more first keypoints P1 are stationary (relative to a global coordinate system) between the first time and the second time. To illustrate, a keypoint that is present at a first position in the field of view 106 (e.g., at a top portion of the field of view 106) may change position or orientation between the first time and the second time such that, at the second time, the keypoint is present at a second position in the field of view 106 (e.g., at a bottom portion of the field of view 106). The difference between the coordinates 122 and the coordinates 126 may represent a perceived movement (e.g., a change in position, such as a vector, absolute value of distance, or a displacement value) of the one or more first keypoints P1 between the first time and the second time relative to the first coordinate system. As described in more detail below, the coordinates 122, the coordinates 126, or both, may be converted or transformed to a different coordinate system (e.g., to a common coordinate system) and leveraged to determine a pose of the second camera 108 or of the device 102.

The processor 112 is additionally configured to determine coordinates 124 of the one or more second keypoints P2 based on the second image 109. The processor 112 may additionally be configured to determine coordinates 128 of the one or more second keypoints P2 based on the fourth image 113. The coordinates 124 and 128 are determined relative to a coordinate system (or a "second coordinate system" or a "third coordinate system") associated with an image space of the second camera 108. The second coordinate system may be local to (e.g., may be tied to or may follow or move with) the second camera 108 or images generated by the second camera 108. Thus, the coordinates 124 may be represented in a same coordinate system as the coordinates 128 even when the second camera 108 moves (e.g., rotationally, vertically, horizontally, etc.) between the first time and the second time. For example, the second coordinate system may correspond to a camera coordinate system 134 of the second camera 108, an image plane coordinate system 133 of the second camera 108, or a pixel coordinate system 139 associated with images generated by the second camera 108.

To illustrate, the second coordinate system may correspond to the camera coordinate system 134. In this example, the coordinates 124 may represent a position of the one or more second keypoints P2 relative to the camera coordinate system 134 associated with the second camera 108 at the first time. As another example, the coordinates 128 may represent a position of the one or more second keypoints P2 relative to the camera coordinate system 134 associated with the second camera 108 at the second time. Because the camera coordinate system 134 is local to (e.g., moves with) the second camera 108 or images generated by the second camera 108, the coordinates 124 and the coordinates 128 may represent the one or more second keypoints P2 relative to the same coordinate system—the camera coordinate system 134—even when a three-dimensional position, orientation, or both, of the second camera 108 changes between the first time and the second time.

As another example, the second coordinate system may correspond to the image plane coordinate system 133. In this example, the coordinates 124 may represent a position of the one or more second keypoints P2 relative to the image plane coordinate system 133 associated with the second camera 108 at the first time. As another example, the coordinates 128 may represent a position of the one or more second keypoints P2 relative to the image plane coordinate system 133 associated with the second camera 108 at the second time. Because the image plane coordinate system 133 is local to (e.g., moves with) the second camera 108 or images generated by the second camera 108, the coordinates 124 and the coordinates 128 may represent the one or more second keypoints P2 relative to the same coordinate system—the image plane coordinate system 133—even when a three-dimensional position, orientation, or both, of the second camera 108 changes between the first time and the second time.

As another example, the second coordinate system may correspond to the pixel coordinate system 139. In this example, the coordinates 124 may represent a position of the one or more second keypoints P2 relative to the pixel coordinate system 139 associated with the second camera 108 at the first time. As another example, the coordinates 128 may represent a position of the one or more second keypoints P2 relative to the pixel coordinate system 139 associated with the second camera 108 at the second time. Because the pixel coordinate system 139 is local to (e.g., moves with) the second camera 108 or images generated by the second camera 108, the coordinates 124 and the coordinates 128 may represent the one or more second keypoints P2 relative to the same coordinate system—the pixel coordinate system 139—even when a three-dimensional position, orientation, or both, of the second camera 108 changes between the first time and the second time.

Because the second coordinate system is local to the second camera 108 or images generated by the second camera 108, when the second camera 108 is in a different position, orientation, or both at the second time than at the first time, the coordinates 124 may be different than the coordinates 128 even if the one or more second keypoints P2 are stationary (relative to a global coordinate system) between the first time and the second time. To illustrate, a keypoint that is present at a first position in the field of view 114 (e.g., at a top portion of the field of view 114) may change position or orientation between the first time and the second time such that, at the second time, the keypoint is present at a second position in the field of view 114 (e.g., at a bottom portion of the field of view 114). The difference between the coordinates 124 and the coordinates 128 may represent a perceived movement (e.g., a change in position, such as a vector, absolute value of distance, or a displacement value) of the one or more second keypoints P2 between the first time and the second time relative to the second coordinate system. The coordinates 124 and 128 may be used to determine a pose of the second camera 108 or of the device 102 as described in more detail below. Alternatively or additionally, the coordinates 124 and 128 may be converted or transformed to a different coordinate system (e.g., to a common coordinate system) and leveraged to determine a pose of the second camera 108 or of the device 102 as described in more detail below.

In some examples, the processor 112 may be configured to identify a subset 181 of the one or more first keypoints P1 and the one or more second keypoints P2 that satisfy a distance criterion 185. Additionally or alternatively, the processor 112 may be configured to identify a subset 183 of the one or more first keypoints P1 and the one or more second keypoints P2 that do not satisfy the distance criterion 185. The distance criterion 185 may be associated with a distance of the one or more first keypoints P1 and the one or more second keypoints P2 from the first camera 104, from the second camera 108, or from the device 102.

The keypoints of the one or more first keypoints P1 in the first and third images 107 and 111 and the one or more second keypoints P2 in the second and fourth images 109 and 113 that are included in the subset 181 may be used to determine a rotation 182 as described below. The keypoints of the one or more first keypoints P1 in the first and third images 107 and 111 and the one or more second keypoints P2 in the second and fourth images 109 and 113 that are in the subset 183 may be used to determine a translation 184 as described below.

In some examples, the processor 112 is configured to determine the subset 181 based on which keypoints of the one or more first and second keypoints P1 and P2 in the images 107, 109, 111, and 113 are detectable when the first camera 104, the second camera 108, or each of the first camera 104 and the second camera is focused at the same focus distance, such as infinity or substantially infinity. The first and second cameras 104 and 108 may be focused at infinity or substantially infinity when the first and second cameras 104 and 108 are set to, or near to, an infinity setting associated with the first and second cameras 104 and 108 (e.g., associated with infinity settings of one or more lenses of the first and second cameras 104 and 108). Alternatively or additionally, the first and second cameras 104 and 108 may be focused at infinity or substantially infinity when the first and second cameras 104 and 108 are at maximum or substantially maximum corresponding focus distances of the first and second cameras 104 and 108. In an illustrative example, each of the first camera 104 and the second camera 108 is configured to capture multiple images at approximately the first time and at approximately the second time including the images 107, 109, 111, and 113 and one or more additional secondary images. The images 107, 109, 111, and 113 are captured at a focus distance that is less than infinity, and the one or more additional secondary images are captured with the corresponding camera focused at infinity or substantially infinity. Keypoints of the one or more first and second keypoints P1 and P2 in the images 107, 109, 111, and 113 that are detectable in the one or more additional secondary images captured with the first and second cameras 104 and 108 focused at infinity (or substantially infinity) may be determined to satisfy the distance criterion 185 and are thus included in the subset 181. Additionally or alternatively, keypoints of the one or more first and second keypoints P1 and P2 in the images 107, 109, 111, and 113 that are not detectable in the secondary images captured with the first and second cameras 104 and 108 focused at infinity (or substantially infinity) may be determined to not satisfy the distance criterion 185 and are included in a subset 183. Determining the subset 181 or the subset 183 based on images captured when the first and second cameras 104 and 108 are focused at infinity (or substantially infinity) is described in more detail below with reference to FIG. 2.

As another example, the processor 112 may be configured to determine the subset 181 by performing frame capture operations using different camera focus distances and by analyzing relative sharpness of the keypoints from the different frame capture operations. The processor 112 may be configured to determine whether a keypoint satisfies the distance criterion 185 based on whether the sharpness of the keypoint decreased or increased from the first time to the second time. For example, when the focus distance (e.g., 500 feet) at the second time is greater than the focus distance (e.g., 25 feet) at the first time, keypoints that have an increased sharpness at the second time are determined to satisfy the distance criterion 185 and are thus included in the subset 181. Additionally or alternatively, when the focus distance (e.g., 500 feet) at the second time is greater than the focus distance (e.g., 25 feet) at the first time, keypoints that have a decreased sharpness at the second time are determined to not satisfy the distance criterion 185 and are included in the subset 183. Determining the subset 181 or the subset 183 based on sharpness of the one or more first and second keypoints P1 and P2 at different focus distances is described in more detail below with reference to FIG. 3.

As another example, the processor 112 may be configured to determine the subset 181 based on relative disparity between images of a stereo camera taken during a single frame capture operation. For example, a stereo camera that includes a first image sensor (e.g., an image capture device, a lens, a camera, etc.) and a second image sensor (e.g., an image capture device, a lens, a camera, etc.). The first image sensor and the second image sensor may face the same direction (e.g., forward facing or rear facing). In a particular implementation, the device 102 includes the stereo camera having the first image sensor (e.g., the first camera 104) and the second image sensor (e.g., the second camera 108). In another particular implementation, the device 102 includes a forward-facing camera (e.g., the first camera 104) and a rear facing stereo camera including the first image sensor (e.g., the second camera 108) and the second image sensor (e.g., a third camera). In an additional implementation, the device 102 includes a rear facing camera (e.g., the first camera 104) and a forward-facing stereo camera including the first image sensor (e.g., the second camera 108) and the second image sensor (e.g., a third camera).

The processor 112 may be configured to estimate disparity of a keypoint in an image (associated with a first frame capture operation or a first capture time) from the first image sensor and the keypoint in an image (associated with the first frame capture operation or the first capture time) from the second image sensor. For example, the first and second image sensors may capture images concurrently or substantially concurrently. The processor 112 may be configured to compare the disparity to a threshold disparity. When the estimated disparity for the keypoint is less than the threshold disparity (e.g., when the disparity between the keypoint in the stereo images is relatively low), the keypoint may be determined to satisfy the distance criterion 185 and is thus included in the subset 181. Additionally or alternatively, when the estimated disparity for the keypoint is greater than a threshold disparity (e.g., when the disparity between the keypoint in the stereo images is relatively high), the keypoint may be determined to not satisfy the distance criterion 185 and is thus included in the subset 183. Determining the subset 181 or the subset 183 based on disparity is described in more detail below with reference to FIG. 4.

As another example, the processor 112 may be configured to determine the subset 181 using a keypoint depth map. For example, the first camera 104 may be a stereo camera that includes a first image sensor and a second image sensor as described below with reference to FIG. 4. The processor 112 may be configured to use images from the first image sensor and the second image sensor to generate a depth map and may determine a distance of a keypoint based on the depth map. When the determined depth for a keypoint is greater than or equal to a threshold, the keypoint is determined to satisfy the distance criterion 185 and is thus included in the subset 181. Alternatively or additionally, when the determined depth for a keypoint is less than the threshold, the keypoint is determined to not satisfy the distance criterion 185 and is thus included in the subset 183.

As another example, the processor 112 may be configured to determine the subset 181 based on whether a pattern in a structured light system is visible or detectable. When the pattern is detectable, a distance or depth of the keypoint may be determined by analyzing the pattern, and the determined distance of the keypoint may be compared to a threshold. When the determined distance is greater than or equal to the threshold, the keypoint is determined to satisfy the distance criterion 185 and is thus included in the subset 181. When the determined distance is less than the threshold, the keypoint is determined to not satisfy the distance criterion 185 and is thus included in the subset 183. When a portion of the pattern associated with a keypoint is not detectable, the processor 112 may be configured to determine that the keypoint satisfies the distance criterion 185 and is included in the subset 181. Determining the subset 181 or the subset 183 based on a structured light system is described in more detail below with reference to FIG. 5.

The processor 112 is configured to determine a pose estimation 178 (e.g., the rotation 182, the translation 184, or both) based on coordinates of the one or more first keypoints P1 relative to a common coordinate system and based on coordinates of the one or more second keypoints P2 relative to the common coordinate system. The pose estimation 178 may be a relative pose estimation determined based on a change in coordinates of the one or more first keypoints P1 relative to the common coordinate system and based on a change in coordinates of the one or more second keypoints P2 relative to the common coordinate system between the first time and the second time. In some examples, the pose estimation 178 corresponds to a pose estimation of the first camera 104, a pose estimation of the second camera 108, or a pose estimation of the device 102. The common coordinate system may be different than the first coordinate system 132, 135, 137. In some examples, the common coordinate system is associated with the second camera 108 or images generated by the second camera 108. For example, the common coordinate system may correspond to the second coordinate system 133, 134 or 139. Alternatively or additionally, in some examples, the common coordinate system is associated with a device that includes the first camera 104, the second camera 108, or both the first camera 104 and the second camera 108. For example, the common coordinate system may correspond to a coordinate system 141 associated with the device 102.

To determine the pose estimation 178 based on coordinates of the one or more first keypoints P1 relative to the common coordinate system, the processor 112 may be configured to determine coordinates 136 of the one or more first keypoints P1 of the first image 107 relative to the common coordinate system 133, 134, 139, or 141. Additionally, in examples in which the pose estimation 178 corresponds to a relative pose estimation, the processor 112 is configured to determine coordinates 138 of the one or more first keypoints P1 of the third image 111 relative to the common coordinate system 133, 134, 139, or 141. The processor 112 is configured to determine the coordinates 136 and 138 by transforming the coordinates 122 and 126 to represent the one or more first keypoints P1 in a same coordinate system as the one or more second keypoints P2 (e.g., in the common coordinate system 133, 134, 139, or 141).

Transforming the coordinates 122 of the one or more first keypoints P1 of the first image 107 to the common coordinate system 133, 134, 139, or 141 may be referred to herein as transforming the one or more first keypoints P1 associated with the first time to a second coordinate system, and the coordinates 136 may be referred to herein as the transformed one or more first keypoints P1 associated with the first time. Additionally, transforming the coordinates 126 of the one or more first keypoints P1 of the third image 111 to the common coordinate system 133, 134, 139, or 141 may be referred to herein as transforming the one or more first keypoints P1 associated with the second time to a second coordinate system, and the coordinates 138 may be referred to herein as the transformed one or more first keypoints P1 associated with the second time. In some examples, the transform may be performed using a known physical relationship between the first camera 104 and the second camera 108. For example, the transform may be performed using an affine transformation, such as a rigid body transformation. In other examples, the transform is performed using a different type of transformation based on a known relationship of the first camera 104 to the second camera 108.

In some examples, the common coordinate system 133, 134, 139, or 141 is associated with the second camera 108 or images generated by the second camera 108. To illustrate, the common coordinate system 133, 134, 139, or 141 may correspond to the pixel coordinate system 139, and the first coordinate system 132, 135, or 137 (associated with the first time) may correspond to the pixel coordinate system 135 of the first image 107. In this example, the coordinates 124 correspond to pixel coordinates of the one or more second keypoints P2 of the second image 109, and the coordinates 122 correspond to pixel coordinates of the one or more first keypoints P1 in the first image 107.

In this example, the processor 112 may be configured to use intrinsic parameters (e.g., geometric properties, such as focal length, principal point offset, etc.) of the first camera 104 to determine image coordinates (of the image plane of the first camera 104) of the one or more first keypoints P1 in the first image 107 based on the pixel coordinates of the one or more first keypoints P1 of the first image. The image coordinates of the one or more first keypoints P1 may then be projected to the camera coordinate system 132 (associated with the first time) using a perspective projection process and using the intrinsic parameters of the first camera 104 to generate first camera coordinates of the one or more first keypoints P1 at the first time. The processor 112 may be configured to perform a transform (e.g., a rigid body transform) to transform the first camera coordinates to the camera coordinate system 134 (associated with the first time) to generate second camera coordinates of the one or more first keypoints P1 associated with the first time. The processor 112 may be configured to perform a perspective projection process using intrinsic parameters of the second camera 108 to transform the second camera coordinates of the one or more first keypoints P1 to the image plane coordinate system 133 (associated with the first time) to generate second camera image coordinates for the one or more first keypoints P1 associated with the first time. The processor 112 may be configured to determine pixel coordinates for the one or more first keypoints P1 at the first time within the pixel coordinate system 139 (associated with the first time) using intrinsic parameters of the second camera 108. The determined pixel coordinates for the one or more first keypoints P1 at the first time within the pixel coordinate system 139 (associated with the first time) may correspond to the coordinates 136.

Additionally, in some examples in which the common coordinate system corresponds to the pixel coordinate system 139, the first coordinate system 132, 135, or 137 (associated with the second time) may correspond to the pixel coordinate system 135 of the third image 111. In this example, the coordinates 128 correspond to pixel coordinates of the one or more second keypoints P2 of the fourth image 113, and the coordinates 126 correspond to pixel coordinates of the one or more first keypoints P1 in the third image 111. The processor 112 may be configured to transform the coordinates 126 to the pixel coordinate system 139 of the fourth image 113 in a similar manner as described above with reference to the coordinates 122 to generate the coordinates 138.

Although the example above describes the common coordinate system associated with the second camera 108 or images generated by the second camera 108 as corresponding to the pixel coordinate system 139, in other examples, the common coordinate system associated with the second camera 108 or images generated by the second camera 108 may correspond to the camera coordinate system 134 or to the image plane coordinate system 133. For example, the coordinates 124 and 128 may represent the one or more second keypoints P2 in the camera coordinate system 134. In such an example, the coordinates 122 and 126 may be transformed from the camera coordinate system 132 associated with the first camera 104 to the camera coordinate system 134 using a transform (e.g., a rigid body transform) as described above.

Accordingly, in examples in which the common coordinate system corresponds to a coordinate system associated with the second camera 108 or images generated by the second camera 108, the coordinates 136 and 138 represent the one or more first keypoints P1 in the same coordinate system as the coordinates 124 and 128 of the one or more second keypoints P2. To illustrate, an example in which the common coordinate system corresponds to the pixel coordinate system 139 is depicted at 172. In the example 172, the one or more first keypoints P1 at the first time and the second time are depicted in the pixel coordinate system 139 (e.g., based on the coordinates 136 and 138) and the one or more second keypoints P2 at the first time and the second time are depicted in the pixel coordinate system 139 (e.g., based on the coordinates 124 and 128). The example 172 is described for illustrative purposes, and it is understood that the device 102 may not generate a graphical representation of the first and second keypoints P1, P2 at the first and second time.

A change 162 in the coordinates 136 and 138 of the one or more first keypoints P1 may represent a perceived movement (e.g., a change in position, orientation, or both) of the one or more first keypoints P1 between the first time and the second time relative to the common coordinate system 133, 134, 139, or 141. A change 164 in the coordinates 124 and 128 of the one or more second keypoints P2 may represent a perceived movement (e.g., a change in position, orientation, or both) of the one or more second keypoints between the first time and the second time relative to the common coordinate system 133, 134, 139, or 141. The change 162 may represent the perceived movement (e.g., a change in position, orientation, or both) of the one or more first keypoints P1 in the same coordinate system as the change 164 represents the perceived movement of the one or more second keypoints P2. The processor 112 may use the perceived movement of the one or more first keypoints P1 from the first time to the second time relative to the image space associated with the second camera 108 and the perceived movement of the one or more second keypoints P2 relative to the image space associated with the second camera 108 to determine the pose estimation 178 as described in more detail below.

In examples in which the common coordinate system 133, 134, 139, or 141 corresponds to the same coordinate system in which the coordinates 124 and 128 represent the one or more second keypoints P2, a transformation may not be performed on the coordinates 124 and 128 because they already represent the one or more second keypoints in the common coordinate system. In other examples, the common coordinate system 133, 134, 139, or 141 corresponds to a coordinate system associated with the device 102. For example, the common coordinate system 133, 134, 139, or 141 may correspond to the coordinate system 141. In these examples, the processor 112 is configured to transform the coordinates 122 of the one or more first keypoints P1 of the first image 107 from the first coordinate system 132, 135, or 137 (associated with the first time) to the coordinate system 141 (associated with the first time) to generate the coordinates 136. The processor 112 may additionally be configured to transform the coordinates 126 of the one or more first keypoints P1 of the third image 111 from the first coordinate system 132, 135, or 137 (associated with the second time) to the coordinate system 141 (associated with the second time) to generate the coordinates 138. Additionally, in this example, the processor 112 is configured to transform the coordinates 124 of the one or more second keypoints P2 of the second image 109 from the second coordinate system 133, 134, or 139 (associated with the first time) to the coordinate system 141 (associated with the first time) to generate the coordinates 154. The processor 112 may additionally be configured to transform the coordinates 128 of the one or more second keypoints P2 in the fourth image 113 from the second coordinate system 133, 134, or 139 (associated with the second time) to the coordinate system 141 (associated with the second time) to generate the coordinates 156.

Transforming the coordinates 124 of the one or more second keypoints P2 in the second image 109 to the coordinate system 141 may be referred to herein as transforming the one or more second keypoints P2 from a first coordinate system associated with the second camera 108 or the second image 109 (at the first time) to the coordinate system 141 (e.g., to a second coordinate system or to a common coordinate system). The coordinates 154 (in the coordinate system 141) may be referred to herein as the transformed one or more second keypoints P2 (associated with the first time). Additionally, transforming the coordinates 128 of the one or more second keypoints P2 in the fourth image 113 to the coordinate system 141 may be referred to herein as transforming the one or more second keypoints P2 from a first coordinate system associated with the second camera 108 or the fourth image 113 (at the second time) to the coordinate system 141 (e.g., to a second coordinate system or to a common coordinate system). The coordinates 156 (in the coordinate system 141) may be referred to herein as the transformed one or more second keypoints P2 (associated with the second time).

The processor 112 may be configured to perform the transformation from the first coordinate system 132, 135, or 137 to the coordinate system 141 using a transform (e.g., a rigid body transform) and intrinsic parameters of the first camera 104. For example, the first coordinate system 132, 135, or 137 (associated with the first time) may correspond to the pixel coordinate system 135 of the first image 107. In this example, the coordinates 122 correspond to pixel coordinates of the one or more first keypoints P1 in the first image 107. The processor 112 may be configured to determine image coordinates (of the image plane of the first camera 104) of the one or more first keypoints P1 in the first image 107 based on the pixel coordinates using intrinsic parameters of the first camera 104. The image coordinates of the one or more first keypoints P1 may then be projected to the camera coordinate system 132 (associated with the first time) using a perspective projection process and intrinsic parameters of the first camera 104 to generate first camera coordinates of the one or more first keypoints P1 at the first time. The processor 112 may be configured to perform a transform (e.g., a rigid body transform) to transform the first camera coordinates to the coordinate system 141 of the device 102 to generate the coordinates 136.

In this example, the first coordinate system 132, 135, or 137 (associated with the second time) may correspond to the pixel coordinate system 135 of the third image 111. The processor 112 may be configured to transform the coordinates 126 to the pixel coordinate system 139 of the fourth image 113 to generate the coordinates 138 using a transform (e.g., a rigid body transform) and intrinsic parameters of the first camera 104 as described above with reference to transforming the coordinates 122 to the coordinates 136. The processor 112 may be configured to transform the coordinates 124 to the coordinate system 141 to generate the coordinates 154 using a transform (e.g., a rigid body transform) and intrinsic parameters of the second camera 108 as described above with reference to transforming the coordinates 122. The processor 112 may be configured to transform the coordinates 128 to the coordinate system 141 to generate the coordinates 156 using a transform (e.g., a rigid body transform) and intrinsic parameters of the second camera 108 as described above with reference to the transforming the coordinates 122.

Thus, in examples in which the common coordinate system 133, 134, 139, or 141 corresponds to a coordinate system associated with the device 102, the one or more first keypoints P1 and the one or more second keypoints P2 are transformed to the image space associated with the device 102. In these examples, the coordinates 136 and 138 of the one or more first keypoints P1 at the first time and at the second time, respectively, describe a position of the one or more first keypoints relative to the same coordinate system (e.g., the coordinate system 141) with which the coordinates 154 and 156 describe the position of the one or more second keypoints P2 at the first time and the second time, respectively. To illustrate, a common space 174 shows the one or more first keypoints P1 at the first time and the second time in the coordinate system 141 (e.g., based on the coordinates 136 and 138) and shows the one or more second keypoints P2 at the first time and the second time in the coordinate system 141 (e.g., based on the coordinates 154 and 156). A change 162 in the coordinates 136 and 138 of the one or more first keypoints P1 may represent a perceived movement of the one or more first keypoints P1 between the first time and the second time relative to the same coordinate system in which a change 164 in the coordinates 154 and 156 of the one or more second keypoints P2 represent a perceived movement of the one or more second keypoints between the first time and the second time. The processor 112 may use the perceived movement of the one or more first keypoints P1 from the first time to the second time relative to the coordinate system 141 and the perceived movement of the one or more second keypoints P2 relative to the coordinate system 141 to determine the pose estimation 178 as described in more detail below.

Although examples described above are with respect to the common coordinate system 133, 134, 139, or 141 corresponding to a coordinate system associated with the device 102, the second camera 108, or images generated by the second camera 108, in other examples, the common coordinate system 133, 134, 139, or 141 may correspond to a coordinate system associated with the first camera 104 or images generated by the first camera 104. In these examples, the coordinates 124 and 128 are transformed to the coordinate system associated with the first camera 104 or images generated by the first camera 104 to generate the coordinates 154 and 156, and the coordinates 122, 126, 154, and 156 are used to determine the pose estimation 178.

The processor 112 may be configured to determine the pose estimation 178 by determining a "fundamental" matrix or "essential" matrix between the one or more first and second keypoints P1 and P2 (as represented in the common coordinate system 133, 134, 139, or 141) at the first time (e.g., the one or more first and second keypoints P1 and P2 in the first image frame) and the one or more first and second keypoints P1 and P2 (as represented in the common coordinate system 133, 134, 139, or 141) at the second time (e.g., the one or more first and second keypoints P1 and P2 in the second image frame) based on the changes 162 and 164.

For example, the common coordinate system 133, 134, 139, or 141 may correspond to the pixel coordinate system 139. In this example, the coordinates 136 and 138 and the coordinates 124 and 128 are in the pixel coordinate system 139, and the processor 112 is configured to determine the "fundamental" matrix or the "essential" matrix based on the change 162 in the coordinates 136, 138 of the one or more first keypoints P1 and the change 164 in the coordinates 124, 128 relative to the pixel coordinate system 139.

As another example, the common coordinate system 133, 134, 139, or 141 may correspond to the image plane coordinate system 133. In this example, the coordinates 136 and 138 and the coordinates 124 and 128 may be in the image plane coordinate system 133, and the processor 112 may be configured to determine the "fundamental" matrix or the "essential" matrix based on the change 162 in the coordinates 136, 138 of the one or more first keypoints P1 and the change 164 in the coordinates 124, 128 relative to the image plane coordinate system 133.

As another example, the common coordinate system 133, 134, 139, or 141 may correspond to the camera coordinate system 134. In this example, the coordinates 136 and 138 and the coordinates 124 and 128 may be in the camera coordinate system 134, and the processor 112 may be configured to determine the "fundamental" matrix or the "essential" matrix based on the change 162 in the coordinates 136, 138 of the one or more first keypoints P1 and the change 164 in the coordinates 124, 128 relative to the camera coordinate system 134.

As another example, the common coordinate system 133, 134, 139, or 141 may correspond to the coordinate system 141 associated with the device 102. In this example, the coordinates 136 and 138 and the coordinates 154 and 156 are in coordinate system 141, and the processor 112 is configured to determine the "fundamental" matrix or the "essential" matrix based on the change 162 in the coordinates 136, 138 of the one or more first keypoints P1 and the change 164 in the coordinates 154, 156 relative to the coordinate system 141.

The processor 112 is configured to extract a rotation 182, a translation 184, or both, of the second camera 108 or the device 102 from the "fundamental" matrix or the "essential" matrix. The pose estimation 178 may correspond to the rotation 182, the translation 184, or both, extracted from the "fundamental" matrix or the "essential" matrix.

Determining the pose estimation 178 based on the coordinates 136, 138 of the one or more first keypoints P1 and the coordinates 124, 128 or 154, 156 of the one or more second keypoints P2 relative to the common coordinate system 133, 134, 139, or 141 (e.g., relative to the same coordinate system) may enable solving for pose when the one or more second keypoints P2 from the second camera 108 are insufficient alone to solve for pose. As an example, the processor 112 may use a particular number of keypoint correspondences, such as five keypoint correspondences as an illustrative, non-limiting example, between frames to solve for the pose estimation 178 between the frames. In this example, the one or more first keypoints P1 may include fewer than the particular number of keypoints (e.g., thereby providing less than the particular number of keypoint correspondences) and may not be present in the second or fourth images 109 and 113. In this example, the one or more second keypoints P2 may include fewer than the particular number of keypoints (e.g., thereby providing less than the particular number of keypoint correspondences) and may not be present in the first and third images 107 and 111. In this example, the one or more first keypoints P1, in combination with the one or more second keypoints P2, may provide the particular number of keypoint correspondences. For example, the particular number of keypoint correspondences may correspond to five, the one or more first keypoints P1 may include two keypoints, and the one or more second keypoints P2 may include three keypoints. Because the one or more first keypoints P1 provide fewer than the particular number of keypoint correspondences, the one or more first keypoints P1 may individually be insufficient to determine the pose estimation 178 (e.g., to solve for pose). Additionally, because the one or more second keypoints P2 provide fewer than the particular number of keypoint correspondences, the one or more second keypoints P2 may individually be insufficient to determine the pose estimation 178 (e.g., to solve for pose).

To address the insufficient number of keypoints from the individual cameras, the one or more first keypoints P1 in the first and third images 107 and 111 may be transformed to the same coordinate system as the one or more second keypoints P2 as described above. Thus, in this example, a single coordinate system may therefore include the particular number of keypoint correspondences at the first time and the particular number of keypoint correspondences at the second time, thereby enabling the processor 112 to solve for relative rotation and translation between the first time and the second time. The processor 112 may therefore be able to solve for pose when the keypoints from any single camera are insufficient alone to solve for pose.

In some examples, the processor 112 is configured to conditionally transform the one or more first keypoints P1 to the common coordinate system 133, 134, 139, or 141. For example, the processor 112 may be configured to determine a number of the one or more second keypoints P2, and to compare the number of the one or more second keypoints P2 to the particular number of keypoint correspondences. The processor 112 may be configured to solve for the pose estimation 178 based on the one or more second keypoints P2 (without using the one or more first keypoints P1) when the number of the one or more second keypoints P2 is greater than or equal to the particular number of keypoint correspondences. In this example, the processor 112 may be configured not to transform the one or more first keypoints P1 to the common coordinate system 133, 134, 139, or 141.

Alternatively or additionally, the processor 112 may be configured to determine a number of the one or more first keypoints P1 when the number of the one or more second keypoints is less than the particular number of keypoint correspondences. When the number of the one or more first keypoints P1 is greater than or equal to the particular number of keypoint correspondences, the processor 112 may determine the pose estimation 178 based on the one or more first keypoints P1 (e.g., without transforming the one or more second keypoints P2 to the first coordinate system or to the coordinate system 141). Alternatively, the processor 112 may be configured to transform the one or more first keypoints P1 to the common coordinate system 133, 134, 139, or 141 without transforming the one or more second keypoints P2 to the common coordinate system 133, 134, 139, or 141.

Alternatively or additionally, when the number of the one or more first keypoints P1 is less than the particular number of keypoint correspondences and the number of the one or more second keypoints P2 is less than the particular number of keypoint correspondences and the combination of the one or more first keypoints P1 and the one or more second keypoints P2 is greater than or equal to the particular number of keypoint correspondences, the processor 112 may be configured to determine the pose estimation 178 based on the one or more first keypoints P1 and the one or more second keypoints P2 relative to the common coordinate system 133, 134, 139, or 141. In this example, the processor 112 is configured to transform the one or more first keypoints P1 to the common coordinate system 133, 134, 139, or 141 as described above.

In some examples, when the one or more first keypoints P1, in combination with the one or more second keypoints, do not may provide the particular number of keypoint correspondences, the device 102 may be configured to capture additional images. Thus, the processor 112 may preserve resources by conditionally performing the transform from the first coordinate system to the common coordinate system 133, 134, 139, or 141.

In some examples, the processor 112 is configured to determine the rotation 182 of the first camera 104 or the second camera 108 using the subset 181 of the first and second keypoints P1 and P2 that satisfy the distance criterion described above. Additionally, the processor 112 may be configured to determine the translation 184 using remaining keypoints (e.g., the subset 183 of the one or more first keypoints P1 and the one or more second keypoints P2 that do not satisfy the distance criterion 185). Thus, the rotation 182 may be determined using different keypoints than the keypoints used to determine the translation 184, and each of the keypoints used to determine the rotation 182 may satisfy the distance criterion 185. Because each of the keypoints used to determine the rotation 182 satisfy the distance criterion 185, the rotation 182 may be determined independently of the translation 184.

To illustrate, a projection of a keypoint in the subset 181 into (e.g., onto) a two dimensional sensor plane (e.g., a projection of a keypoint into the image plane coordinate system 133 or into the pixel coordinate system 139) may be referred to as a vanishing point v and may have the following homogeneous coordinates $v = [v_x \ v_y]$, where $v_x$ and $v_y$ are the image coordinates of the keypoint in pixels. For example, at the first time, a keypoint may correspond to a vanishing point $v_1$ described by pixel coordinates $$[v_{x_1} \ v_{y_1} \ 1]$$

and the keypoint may correspond to a vanishing point $v_2$ at the second time described by pixel coordinates $$[v_{x_2} \ v_{y_2} \ 1],$$

where $$v_{x_1}$$

and $$v_{y_1}$$

are the image coordinates of the projected keypoint in the image plane coordinate system 139 at the first time and $$v_{x_2}$$

and $$v_{y_2}$$

are the image coordinates of the projected keypoint in the image plane coordinate system 139 at the second time. A directional vector d of a vanishing point in a Euclidean space of the second camera 108 is described by d $$d = \frac{K^{-1}v}{\|K^{-1}v\|},$$

$$\text{where } K = \begin{bmatrix} a_x & s & x_0 \\ 0 & a_y & y_0 \\ 0 & 0 & 1 \end{bmatrix}$$

is the calibration matrix of the second camera 108, $a_x$ and $a_y$ are scale factors for the second camera 108, s is a skew of the second camera 108, and $x_0$ and $y_0$ are the coordinates of the optical center of the second camera 108. For example, a directional vector $d_1$ for a keypoint at the first time may correspond to $$d_1 = \frac{K^{-1}v_1}{\|K^{-1}v_1\|}$$

and a directional vector $d_2$ for the keypoint at the second time may correspond to $$d_2 = \frac{K^{-1}v_2}{\|K^{-1}v_2\|}.$$

Because each of the keypoints in the subset 181 satisfy the distance criterion 185, the keypoints in the subset 181 may correspond to scene points that are a sufficient distance from the camera 104 or the camera 108 such that a difference between vanishing points of the keypoints in the subset 181 at the first time and at the second time may be independent of (or may be treated as being independent of) the translation 184. Because the difference between a vanishing point (of the keypoints in the subset 181) at the first time and at the second time may be independent of (or may be treated as being independent of) the translation 184, the rotation 182 may be solved using the relationship $d_2 = Rd_1$, where R corresponds to a camera rotation matrix (e.g., corresponds to the rotation 182) that has three degrees of freedom for yaw, pitch, and roll. Thus, the processor 112 may be configured to solve for the rotation 182 independently of the translation 184 using keypoints that satisfy the distance criterion 185.

Because detected movement in distant keypoints is more representative of rotation movement than translation movement, using keypoints that satisfy the distance criterion (e.g., using the subset 181) to solve for the rotation 182 may enable a more accurate determination of aspects of the detected movement that are a product (result) of rotation. Additionally, in some examples, the estimation of the rotation 182 becomes more robust as the number of keypoint pairs used to solve for the rotation 182 increases. Using keypoints from multiple cameras may provide more keypoints that are available to solve for the rotation 182 (e.g., may provide more keypoints that satisfy the distance criterion 185), thereby enabling the processor 112 to use more keypoint pairs to solve for the rotation 182 and to therefore make a more robust estimation of the rotation 182 as compared to systems that do not use keypoints from multiple cameras in a common coordinate system.

In some examples, the processor 112 is further configured to determine a reconstruction of one or more objects in the first image 107, one or more objects in the second image 109, or both, based on the pose estimation 178. For example, the pose estimation 178 may enable the processor 112 to determine a depth map image that the processor 112 uses to determine the reconstruction (e.g., a three-dimensional reconstruction). The reconstruction of the one or more objects may be used to map an environment in which the device 102 is located. The map of the environment may be used to navigate the device 102 in the environment. Using the one or more first keypoints P1 and the one or more second keypoints P2 to solve for the pose estimation 178 as described above may enable a more accurate reconstruction because the processor 112 may be able to solve for pose at more positions or more frequently than systems that do not solve for pose using keypoints from different cameras relative to a common coordinate system.

Figure 2:
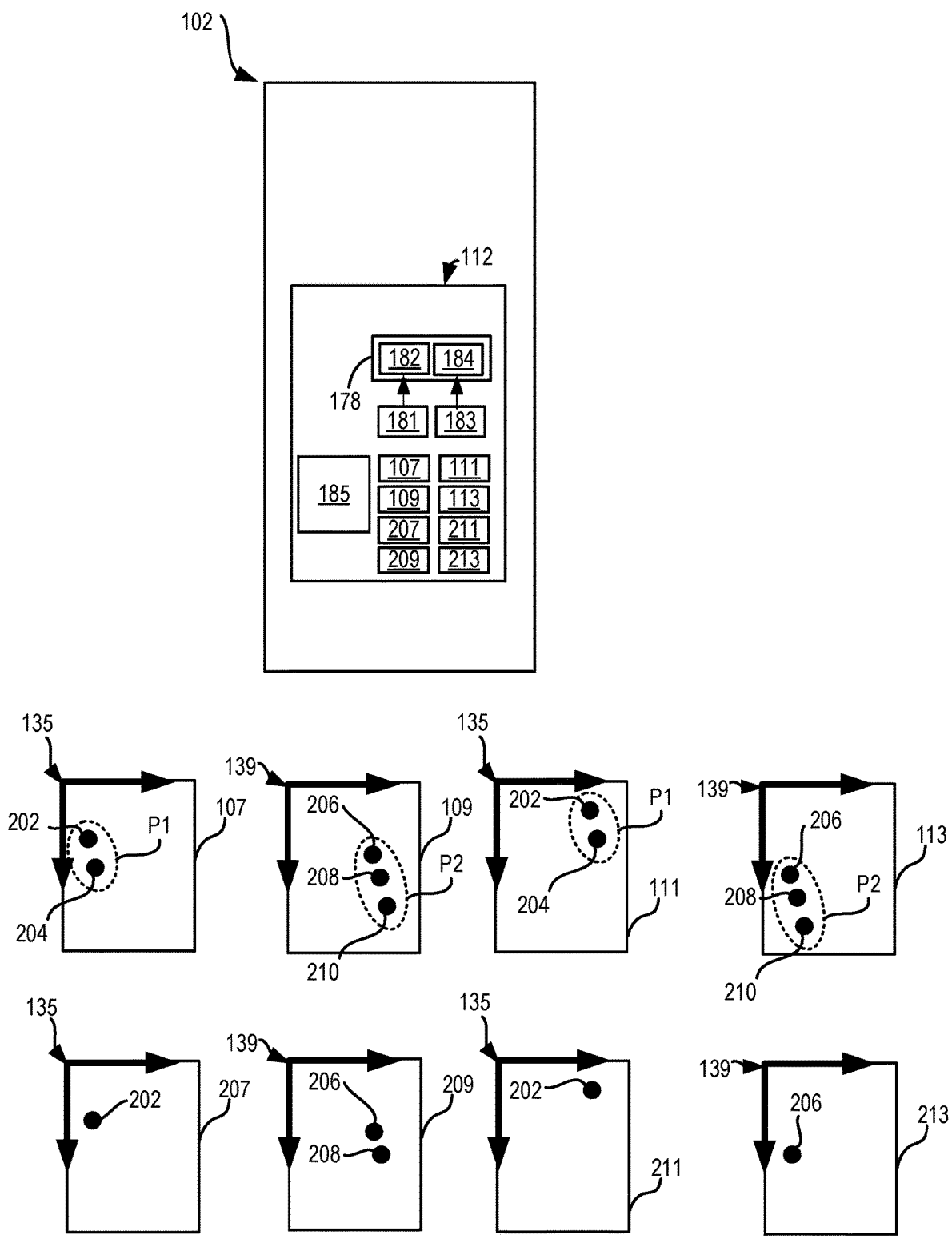
FIG. 2 is a block diagram of a particular illustrative example of the device of FIG. 1 configured to determine a subset of one or more first and second keypoints from the first and second cameras.

FIG. 2 illustrates the device 102 of FIG. 1 configured to determine the subset 181, the subset 183, or both, based on which keypoints of the one or more first and second keypoints P1 and P2 are detectable when the first and second cameras 104 and 108 are focused at infinity or substantially infinity. The first and second cameras 104 and 108 may be focused at infinity or substantially infinity when the first and second cameras 104 and 108 are set to, or near to, an infinity setting associated with the first and second cameras 104 and 108 (e.g., associated with infinity settings of lenses of the first and second cameras 104 and 108). Alternatively or additionally, the first and second cameras 104 and 108 may be focused at infinity or substantially infinity when the first and second cameras 104 and 108 are at maximum or substantially maximum corresponding focus distances of the first and second cameras 104 and 108. In this example, each of the first camera 104 and the second camera 108 is configured to capture multiple images at the first time and at the second time. At least one of the multiple images of each of the cameras is captured with the corresponding camera focused at infinity or substantially infinity. Keypoints of the one or more first and second keypoints P1 and P2 that are detectable in the images captured with the first and second cameras 104 and 108 focused at infinity or substantially infinity may be determined to satisfy the distance criterion 185.

For example, at the first time, the first camera 104 may be configured to capture the first image 107 with the first camera 104 focused at a first distance that is less than a focus distance of infinity or substantially infinity. At approximately the first time, the first camera 104 may also be configured to capture a secondary image 207 with the first camera 104 focused at infinity or substantially infinity. As another example, at the first time, the second camera 108 may be configured to capture the second image 109 with the second camera 108 focused at a first distance that is less than infinity or substantially infinity. At approximately the first time, the second camera 108 may also be configured to capture a secondary image 209 with the second camera 108 focused at infinity or substantially infinity.

As another example, at the second time, the first camera 104 may be configured to capture the third image 111 with the first camera 104 focused at a first distance that is less than a focus distance of infinity or substantially infinity. At approximately the second time, the first camera 104 may also be configured to capture a secondary image 211 with the first camera 104 focused at infinity or substantially infinity. As another example, at the second time, the second camera 108 may be configured to capture the fourth image 113 with the second camera 108 focused at a first distance that is less than a focus distance of infinity or substantially infinity. At approximately the second time, the second camera 108 may also be configured to capture a secondary image 213 with the second camera 108 focused at infinity or substantially infinity.

In this example, keypoints of the one or more first and second keypoints P1 and P2 that are detectable in one or more of the secondary images may be determined to satisfy the distance criterion 185 and thus are included in the subset 181. Alternatively or additionally, keypoints of the one or more first and second keypoints P1 and P2 that are not detectable in the secondary images captured at approximately the first time and at approximately the second time may be determined to not satisfy the distance criterion 185 and thus are included in the subset 183.

To illustrate, the one or more first keypoints P1 (that are detectable in the first image 107 and the third image 111) may include multiple keypoints including a first keypoint 202 and a second keypoint 204. In this example, the first keypoint 202 may be detectable in the secondary image 207, and the second keypoint 204 may not be detectable in the secondary image 207. Thus, in this example, the first keypoint 202 may be determined to satisfy the distance criterion 185, and the second keypoint 204 may be determined to not satisfy the distance criterion 185. Accordingly, in this example, the processor 112 is configured to include the first keypoint 202 of the first and third images 107 and 111 in the subset 181, and to include the second keypoint 204 of the first and third images 107 and 111 in the subset 183.

As another example, the one or more second keypoints P2 (that are detectable in the second image 109 and the fourth image 113) may include multiple keypoints including a first keypoint 206, a second keypoint 208, and a third keypoint 210. In this example, the first keypoint 206 and the second keypoint 208 may be detectable in the secondary image 209, and the third keypoint 210 may not be detectable in the secondary image 209. Thus, in this example, the first keypoint 206 and the second keypoint 208 may be determined to satisfy the distance criterion 185, and the third keypoint 210 may be determined to not satisfy the distance criterion 185. Accordingly, in this example, the processor 112 is configured to include the first keypoint 206 of the second and fourth images 109 and 113 and the second keypoint 208 of the second and fourth images 109 and 113 in the subset 181, and to include the third keypoint 210 of the second and fourth images 109 and 113 in the subset 183.

In this example, the subset 181 includes the first keypoint 202 of the first and third images 107 and 111, the first keypoint 206 of the second and fourth images 109 and 113, and the second keypoint 208 of the second and fourth images 109 and 113. The subset 183 includes the second keypoint 204 of the first and third images 107 and 111 and the third keypoint 210 of the second and fourth images 109 and 113. The keypoints of the one or more first keypoints P1 in the first and third images 107 and 111 and the one or more second keypoints P2 in the second and fourth images 109 and 113 that are included in the subset 181 may be used to determine the rotation 182 as described above with reference to FIG. 1. The keypoints of the one or more first keypoints P1 in the first and third images 107 and 111 and the one or more second keypoints P2 in the second and fourth images 109 and 113 that are in the subset 183 may be used to determine the translation 184 as described above with reference to FIG. 1.

In other examples, keypoints of the one or more first and second keypoints P1 and P2 that are detectable in both of the secondary images may be determined to satisfy the distance criterion 185, and keypoints of the one or more first and second keypoints P1 and P2 that are not detectable in at least one secondary image captured at approximately the first time and at approximately the second time may be determined to not satisfy the distance criterion 185. For example, the first keypoint 202 may be detectable in both of the secondary images 207 and 211, and may thus be determined to satisfy the distance criterion 185. As another example, the first keypoint 206 may be detectable in both of the secondary images 209 and 213, and thus may be determined to satisfy the distance criterion 185. As another example, the second keypoint 206 may be detectable in the secondary image 209 and may not be detectable in the secondary image 213, and may thus be determined to not satisfy the distance criterion 185. Thus, in these examples, the subset 181 includes the first keypoints 202 and 206 and the subset 183 includes the second keypoints 204 and 208 and the third keypoint 210.

Figure 3:
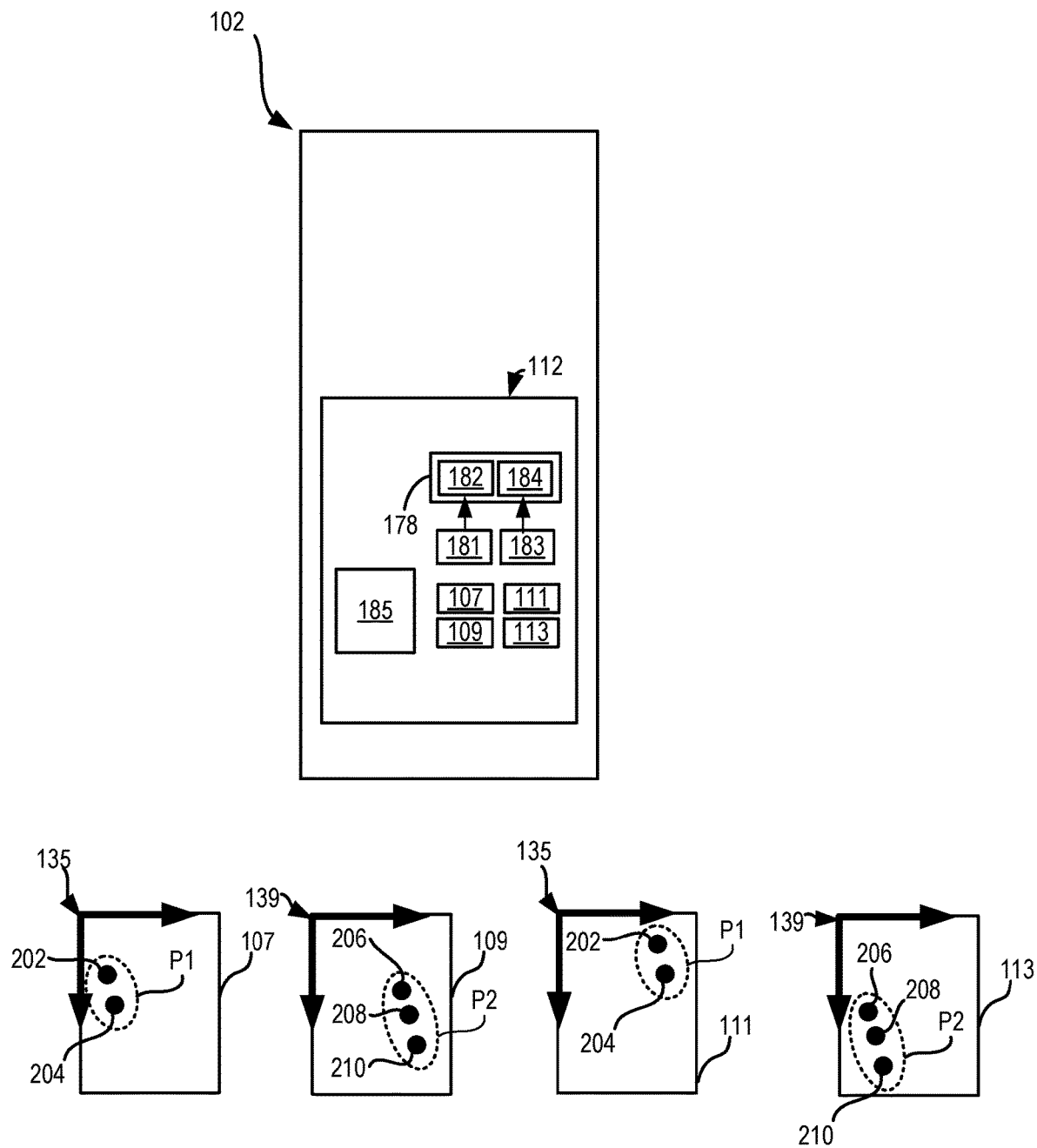
FIG. 3 is a block diagram of a particular illustrative example of the device of FIG. 1 configured to determine a subset of one or more first and second keypoints from the first and second cameras based on a sharpness of the one or more first and second keypoints.

FIG. 3 illustrates the device 102 of FIG. 1 configured to determine the subset 181 based on sharpness of the one or more first and second keypoints P1 and P2 at different focus distances. In this example, the first camera 104 and the second camera 108 are configured to capture the first and second images 107 and 109 at the first time using a different focus distance than the first and second cameras 104 and 108 use to capture the third and fourth images 111 and 113. Keypoints of the one or more first and second keypoints P1 and P2 that have particular relative sharpness differences between the first time (e.g., the first image 107 and the second image 109) and the second time (e.g., the third image 111 and the fourth image 113) may be determined to satisfy the distance criterion 185.

For example, the first camera 104 may be configured to capture the first image 107 at the first time using a first focus distance, and the second camera 108 may be configured to capture the second image 109 at the first time using a first focus distance. In some implementations, the first focus distance of the first camera 104 may be different than the first focus distance of the second camera 108. In other implementations, the first focus distance of the first camera 104 may be the same as the first focus distance of the second camera 108. Additionally, the first camera 104 may be configured to capture the third image 111 at the second time using a second focus distance, and the second camera 108 may be configured to capture the fourth image 113 at the second time using the second focus distance. In some implementations, the second focus distance of the first camera 104 may be different than the second focus distance of the second camera 108. In other implementations, the second focus distance of the first camera 104 may be the same as the second focus distance of the second camera 108. The first focus distance of the first camera 104 may be greater than the second focus distance of the first camera 104. Alternatively, the first focus distance of the first camera 104 may be less than the second focus distance of the first camera 104. The first focus distance of the second camera 108 may be greater than the second focus distance of the second camera 108. Alternatively, the first focus distance of the second camera 108 may be less than the second focus distance of the second camera 108.

The processor 112 may be configured to determine a sharpness of each keypoint of the one or more first and second keypoints P1 and P2 in the first image 107, the second image 109, the third image 111, and the fourth image 113. The processor 112 may be configured to compare the sharpness of each keypoint in the first image 107 to the sharpness of the keypoint in the third image 111, and may be configured to compare the sharpness of each keypoint in the second image 109 to the sharpness of the keypoint in the fourth image 113. To illustrate, the processor 112 may be configured to determine a first sharpness for each of the keypoints 202, 204, 206, 208, and 210 at the first time (e.g., the first image 107 and the second image 109) and may be configured to determine a second sharpness for each of the keypoints 202, 204, 206, 208, and 210 at the second time (e.g., the third image 111 and the fourth image 113).

In a first example, as described above, the first focus distance (at the first time corresponding to the first image 107) of the first camera 104 may be greater than the second focus distance (at the second time corresponding to the third image 111) of the first camera 104. In this example, the processor 112 may be configured to determine that each keypoint of the one or more first and second keypoints P1 and P2 that has a first sharpness (at the first time corresponding to the first image 107 and the second image 109) that is greater than the keypoint's second sharpness (at a second time corresponding to the third image 111 and the fourth image 113) satisfies the distance criterion 185 (e.g., is to be included in the subset 181). Alternatively or additionally, each keypoint of the one or more first keypoints that has a first sharpness (at the first time corresponding to the first image 107 and the second image 109) that is less than the keypoint's second sharpness (at a second time corresponding to the third image 111 and the fourth image 113) does not satisfy the distance criterion 185 (e.g., is to be included in the subset 183). To illustrate, the processor 112 may be configured to determine that the first sharpness (at the first time corresponding to the first image 107 and the second image 109) of each of the keypoints 202, 206, and 208 is greater than the second sharpness (at a second time corresponding to the third image 111 and the fourth image 113) of each of the keypoints 202, 206, and 208. In this example, the processor 112 may be configured to determine that the first sharpness (at the first time corresponding to the first image 107 and the second image 109) of each of the keypoints 204 and 210 is less than the second sharpness (at a second time corresponding to the third image 111 and the fourth image 113) of each of the keypoints 204 and 210. Thus, in this example, the processor 112 may be configured to include the keypoints 202, 206, and 208 in the subset 181, to include the keypoints 204 and 210 in the subset 183, or both.

As another example, as described above, the first focus distance of the second camera 108 may be less than the second focus distance of the second camera 108. In this example, the processor 112 may be configured to determine that each keypoint of the one or more first and second keypoints P1 and P2 that has a first sharpness that is less than the keypoint's second sharpness satisfies the distance criterion 185 (e.g., is to be included in the subset 181). Alternatively or additionally, each keypoint of the one or more first keypoints that has a first sharpness that is greater than the keypoint's second sharpness does not satisfy the distance criterion 185 (e.g., is to be included in the subset 183). To illustrate, the processor 112 may be configured to determine that the first sharpness of each of the keypoints 202, 206, and 208 is less than the second sharpness of each of the keypoints 202, 206, and 208. In this example, the processor 112 may be configured to determine that the first sharpness of each of the keypoints 204 and 210 is greater than the second sharpness of each of the keypoints 204 and 210. Thus, in this example, the processor 112 may be configured to include the keypoints 202, 206, and 208 in the subset 181, to include the keypoints 204 and 210 in the subset 183, or both.

Thus, in this example, the subset 181 includes the first keypoint 202, the first keypoint 206, and the second keypoint 208, and, additionally or alternatively, the subset 183 includes the second keypoint 204 and the third keypoint 210. The keypoints included in the subset 181 may be used to determine the rotation 182 as described above with reference to FIG. 1. The keypoints in the subset 183 may be used to determine the translation 184 as described above with reference to FIG. 1.

Figure 4:
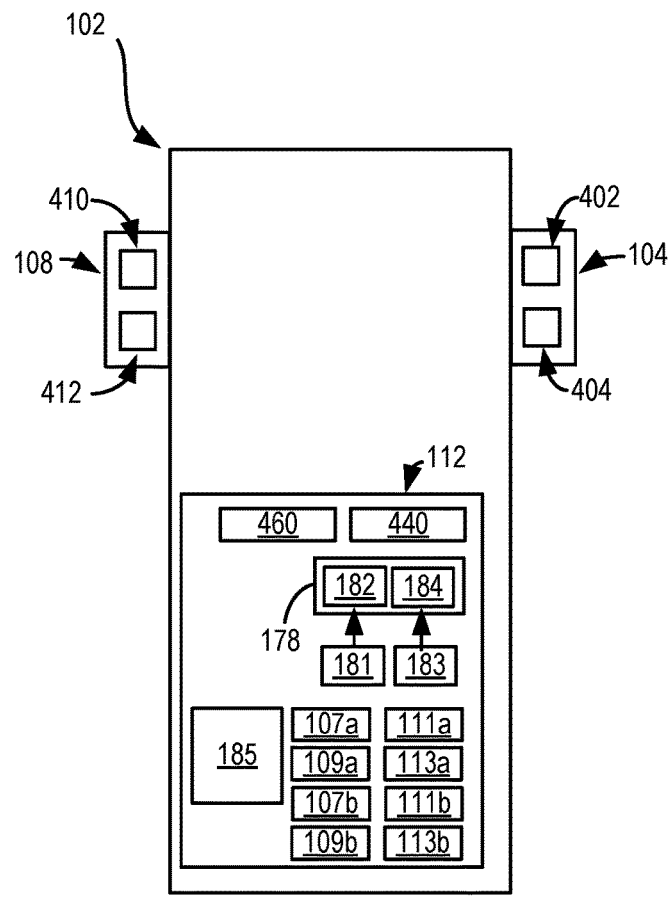
FIG. 4 is a block diagram of a particular illustrative example of the device of FIG. 1 configured to determine a subset of one or more first and second keypoints from the first and second cameras based on relative disparities of the one or more first and second keypoints.
Figure 4:
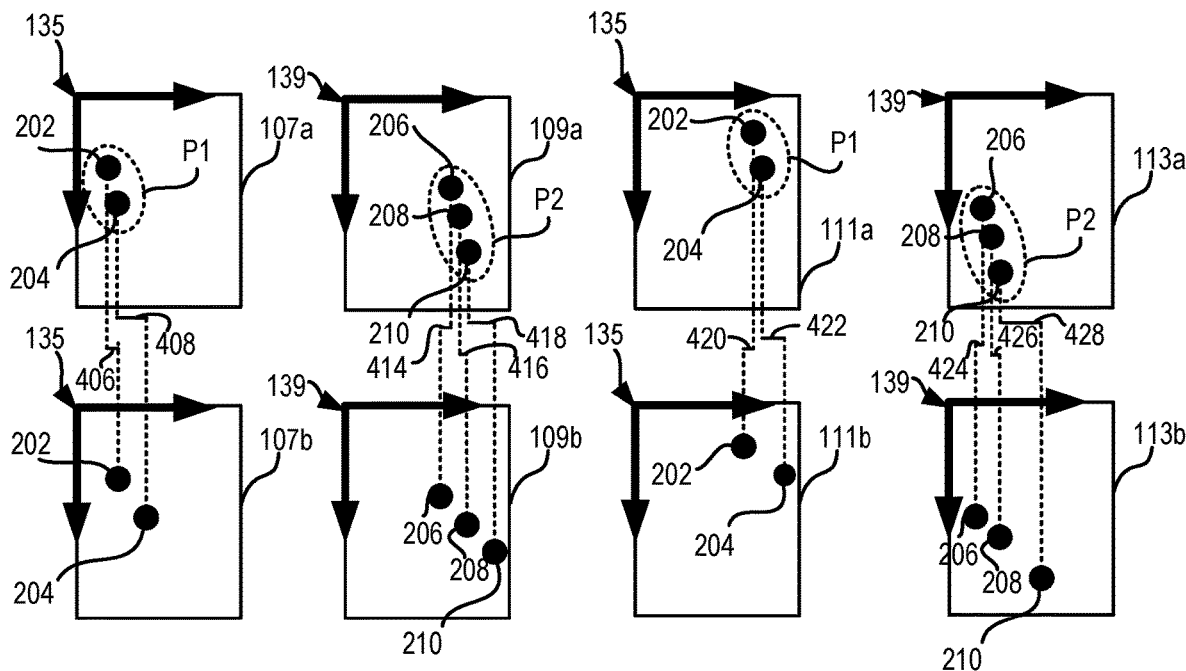

FIG. 4 illustrates the device 102 of FIG. 1 configured to determine the subset 181 based on relative disparity of keypoints between images of a stereo camera taken during a single frame capture operation. For example, a relative disparity of a keypoint between images of a stereo camera may correspond to a distance between the corresponding points in the images. The distance may be in a single dimension (X or horizontal, or Y or vertical) or an absolute distance value of X minus Y. Additionally or alternatively, the distance may be represented by a number of pixels between the corresponding points in the images. The relative disparity of a keypoint may be determined based on a center of the keypoint or based on a different part of the keypoint. In this example, the processor 112 determines a relative disparity for each of the one or more first and second keypoints P1 and P2 at the first time and the second time.

To illustrate, the one or more first keypoints P1 (that are detectable in the first image 107 and the third image 111) may include multiple keypoints including a first keypoint 202 and a second keypoint 204, and the first camera 104, such as a stereo camera, may include a first image sensor 402 and a second image sensor 404. The first image sensor 402 may be configured to capture an image 107a at the first time and the second image sensor 404 may be configured to capture an image 107b at the first time. The processor 112 may be configured to determine a relative disparity 406 (e.g., in pixels) between the first keypoint 202 in the image 107a from the first image sensor 402 at the first time and the first keypoint 202 in the image from the second image sensor 404 at the first time. As another example, the processor 112 may be configured to determine a relative disparity 408 between the second keypoint 204 in the image 107a from the first image sensor 402 at the first time and the second keypoint 204 in the image 107b from the second image sensor 404 at the first time.

Additionally or alternatively, the first image sensor 402 may be configured to capture an image 111a at the second time and the second image sensor 404 may be configured to capture an image 111b at the second time. The processor 112 may be configured to determine a relative disparity 420 (e.g., in pixels) between the first keypoint 202 in the image 111a from the first image sensor 402 at the second time and the first keypoint 202 in the image 111b from the second image sensor 404 at the second time. As another example, the processor 112 may be configured to determine a relative disparity 422 between the second keypoint 204 in the image 111a from the first image sensor 402 at the second time and the second keypoint 204 in the image 111b from the second image sensor 404 at the second time.

As another example, the one or more second keypoints P2 (that are detectable in the second image 109 and the fourth image 113) may include multiple keypoints including a first keypoint 206, a second keypoint 208, and a third keypoint 210, and the second camera 108 may include a third image sensor 410 and a fourth image sensor 412.

The third image sensor 410 may be configured to capture an image 109a at the first time and the fourth image sensor 412 may be configured to capture an image 109b at the first time. The processor 112 may be configured to determine a relative disparity 414 (e.g., in pixels) between the first keypoint 206 in the image 109a from the third image sensor 410 at the first time and the first keypoint 206 in the image 109b from the fourth image sensor 412 at the first time. As another example, the processor 112 may be configured to determine a relative disparity 416 (e.g., in pixels) between the second keypoint 208 in the image 109a from the third image sensor 410 at the first time and the second keypoint 208 in the image 109b from the fourth image sensor 412 at the first time. As another example, the processor 112 may be configured to determine a relative disparity 418 between the third keypoint 210 in the image 109a from the third image sensor 410 at the first time and the third keypoint 210 in the image 109b from the fourth image sensor 412 at the first time.

Additionally or alternatively, the third image sensor 410 may be configured to capture an image 113a at the second time and the fourth image sensor 412 may be configured to capture an image 113b at the second time. The processor 112 may be configured to determine a relative disparity 414 (e.g., in pixels) between the first keypoint 206 in the image 113*a* from the third image sensor 410 at the second time and the first keypoint 206 in the image 113*b* from the fourth image sensor 412 at the second time. As another example, the processor 112 may be configured to determine a relative disparity 416 (e.g., in pixels) between the second keypoint 208 in the image 113*a* from the third image sensor 410 at the second time and the second keypoint 208 in the image 113*b* from the fourth image sensor 412 at the second time. As another example, the processor 112 may be configured to determine a relative disparity 418 between the third keypoint 210 in the image 113*a* from the third image sensor 410 at the second time and the third keypoint 210 in the image 113*b* from the fourth image sensor 412 at the second time.

The processor 112 may be configured to compare the relative disparities to a threshold disparity (e.g., a number of pixels) to determine whether the relative disparity for the keypoint satisfies the threshold disparity, and thus whether a distance of the keypoint satisfies the distance criterion 185. Keypoints that have a relative disparity that is less than or equal to the threshold disparity may be determined to satisfy the distance criterion 185.

For example, the processor 112 may be configured to compare the relative disparity 406 to a threshold disparity 440 to determine that the relative disparity for the first keypoint 202 is less than or equal to the threshold disparity 440 (e.g., and thus that a distance of the first keypoint 202 satisfies the distance criterion 185). The processor 112 may be configured to compare the relative disparity 408 to the threshold disparity 440 to determine that the relative disparity for the second keypoint is greater than the threshold disparity 440 (e.g., and thus that a distance of the second keypoint 204 does not satisfy the distance criterion 185). The processor 112 may compare the relative disparity 414 to a threshold disparity 460 (e.g., a number of pixels) to determine that the relative disparity 414 for the first keypoint 206 is less than or equal to the threshold disparity 460 (e.g., and thus that a distance of the first keypoint 206 satisfies a distance criterion 185). The processor 112 may compare the relative disparity 416 to the threshold disparity 460 to determine that the relative disparity 416 for the second keypoint 208 is less than or equal to the threshold disparity 460 (e.g., and thus that a distance of the second keypoint 208 is greater than a distance criterion 185). The processor 112 may compare the relative disparity 418 to the threshold disparity 460 to determine that the relative disparity 418 for the third keypoint 210 is greater than the threshold disparity 460 (e.g., and thus that a distance of the third keypoint 210 does not satisfy the distance criterion 185).

Additionally or alternatively, the processor 112 may be configured to compare the relative disparity 420 to the threshold disparity 440 to determine that the relative disparity for the first keypoint 202 at the second time is less than or equal to the threshold disparity 440 (e.g., and thus that a distance of the first keypoint 202 satisfies the distance criterion 185). The processor 112 may be configured to compare the relative disparity 422 to the threshold disparity 440 to determine that the relative disparity for the second keypoint 204 at the second time is greater than the threshold disparity 440 (e.g., and thus that a distance of the second keypoint 204 does not satisfy the distance criterion 185). The processor 112 may compare the relative disparity 424 to the threshold disparity 460 to determine that the relative disparity 414 for the first keypoint 206 at the second time is less than or equal to a threshold disparity 460 (e.g., and thus that a distance of the first keypoint 206 satisfies a distance criterion 185). The processor 112 may compare the relative disparity 426 to the threshold disparity 460 to determine that the relative disparity 416 for the second keypoint 208 at the second time is greater than the threshold disparity 460 (e.g., and thus that a distance of the second keypoint 208 does not satisfy the distance criterion 185). The processor 112 may compare the relative disparity 428 to the threshold disparity 460 to determine that the relative disparity 418 for the third keypoint 210 at the second time is greater than the threshold disparity 460 (e.g., and thus that a distance of the third keypoint 210 does not satisfy the distance criterion 185).

In some examples, the processor 112 is configured to include a keypoint in the subset 181 based on the keypoint satisfying the distance criterion 185 at the first time, at the second time, or at both the first time and the second time. Alternatively or additionally, the processor 112 may be configured to include the keypoint in the subset 183 based on the keypoint not satisfying the distance criterion 185 at both the first time and the second time. For example, the processor 112 may include the first keypoint 202 in the subset 181 based on determining that the relative disparity 406 is less than or equal to the threshold disparity 440 and thus that the first keypoint 202 satisfies the distance criterion 185 at the first time, or based on determining that the relative disparity 420 is less than or equal to the threshold disparity 440 and thus that the first keypoint 202 satisfies the distance criterion 185 at the second time. The processor 112 may include the first keypoint 206 in the subset 181 based on determining that the relative disparity 414 is less than or equal to the threshold disparity 460 and thus that the keypoint 206 satisfies the distance criterion 185 at the first time, or based on determining that the relative disparity 424 is less than or equal to the threshold disparity 460 and thus that the keypoint 206 satisfies the distance criterion 185 at the second time. The processor 112 may include the second keypoint 208 in the subset 181 based on determining that the relative disparity 416 is less than or equal to the threshold disparity 460 and thus that the second keypoint 208 satisfies the distance criterion 185 at the first time, or based on determining that the relative disparity 426 is less than or equal to the threshold disparity 460 and thus that the second keypoint 208 satisfies the distance criterion 185 at the second time. The processor 112 may include the second keypoint 204 in the subset 183 based on determining that the relative disparity 408 at the first time and the relative disparity 422 at the second time is greater than the threshold disparity 440. The processor 112 may include the third keypoint 210 in the subset 183 based on determining that the relative disparity 418 at the first time and the relative disparity 428 at the second time is greater than the threshold disparity 460.

Thus, in this example, the subset 181 includes the first keypoint 202, the first keypoint 206, and the second keypoint 208, and the subset 183 includes the second keypoint 204 and the third keypoint 210. The keypoints included in the subset 181 may be used to determine the rotation 182 as described above with reference to FIG. 1. The keypoints in the subset 183 may be used to determine the translation 184 as described above with reference to FIG. 1.

In other examples, the processor 112 is configured to include a keypoint in the subset 181 based on the keypoint satisfying the distance criterion 185 at the first time and the second time. Additionally or alternatively, the processor 112 may be configured to include the keypoint in the subset 183 based on the keypoint not satisfying the distance criterion 185 at the first time, at the second time, or at the first time and the second time. For example, the processor 112 may include the first keypoint 202 in the subset 181 based on determining that the relative disparity 406 and the relative disparity 420 are less than or equal to the threshold disparity 440 and thus that the first keypoint 202 satisfies the distance criterion 185 at the first and second times. The processor 112 may include the first keypoint 206 in the subset 181 based on determining that the relative disparity 414 and the relative disparity 424 are less than or equal to the threshold disparity 460 and thus that the first keypoint 206 satisfies the distance criterion 185 at the first and second times. The processor 112 may include the second keypoint 204 in the subset 183 based on determining that the relative disparity 408 at the first time is greater than the threshold disparity 440 and thus that the second keypoint 204 does not satisfy the distance criterion 185 at the first time, or based on determining that the relative disparity 422 at the second time is greater than the threshold disparity 440 and thus that the second keypoint 204 does not satisfy the distance criterion 185 at the second time. The processor 112 may include the second keypoint 208 in the subset 183 based on determining that the relative disparity 426 at the second time is greater than the threshold disparity 460 and thus that the second keypoint 208 does not satisfy the distance criterion 185 at the second time. The processor 112 may include the third keypoint 210 in the subset 183 based on determining that the relative disparity 418 at the first time is greater than the threshold disparity 460 and thus that the third keypoint 210 does not satisfy the distance criterion 185 at the first time, or based on determining that the relative disparity 428 at the second time is greater than the threshold disparity 460 and thus that the third keypoint 210 does not satisfy the distance criterion 185 at the second time.

Thus, in this example, the subset 181 includes the first keypoint 202 and the first keypoint 206, and the subset 183 includes the second keypoint 204, the second keypoint 208, and the third keypoint 210. The keypoints included in the subset 181 may be used to determine the rotation 182 as described above with reference to FIG. 1. The keypoints in the subset 183 may be used to determine the translation 184 as described above with reference to FIG. 1.

Figure 5:
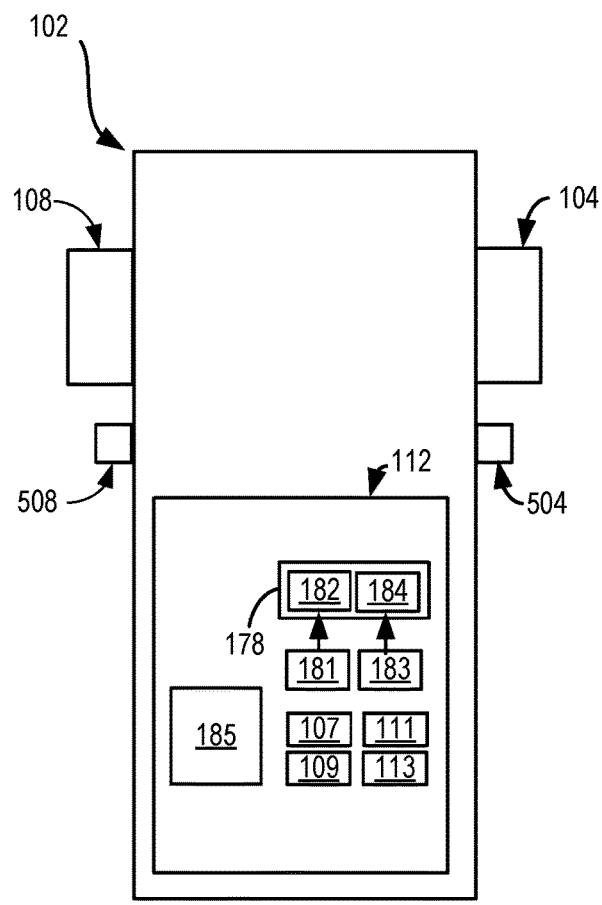
FIG. 5 is a block diagram of a particular illustrative example of the device of FIG. 1 configured to determine a subset of one or more first and second keypoints based on whether a structured light pattern is detectable at the one or more first and second keypoints.
Figure 5:
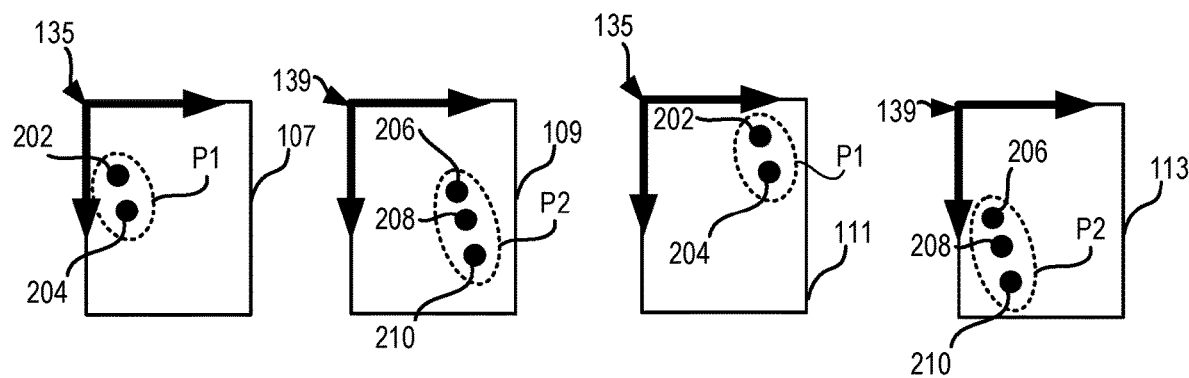

FIG. 5 illustrates the device 102 of FIG. 1 configured to determine the subset 181 based on whether a pattern in a structured light system is visible or detectable. When the pattern is detectable, a distance or depth of the keypoint may be determined by analyzing the pattern, and the determined distance of the keypoint may be compared to the distance criterion 185 to determine whether the keypoint satisfies the distance criterion 185. Alternatively or additionally, when a portion of the pattern associated with a keypoint is not detectable, it may be determined that the keypoint satisfies the distance criterion 185.

To illustrate, the one or more first keypoints P1 (that are detectable in the first image 107 and the third image 111) may include multiple keypoints including a first keypoint 202 and a second keypoint 204, and the device 102 may include one or more first projectors 504. The one or more first projectors 504 may be configured to project a structured light pattern, and the first camera 104 may be configured to capture the first image 107 while the scene is under structured light illumination from the one or more first projectors 504. The processor 112 may be configured to determine whether the structured light pattern is detectable at the first keypoint 202 in the first image 107. The processor 112 may determine that the structured light pattern is detectable at the first keypoint 202 and may estimate a distance of the first keypoint 202 in the first image 107 based on the detected structured light pattern associated with the first keypoint 202 in the first image 107. As another example, the processor 112 may be configured to determine whether the structured light pattern is detectable at the second keypoint 204 in the first image 107. The processor 112 may determine that the structured light pattern is not detectable at the second keypoint 204.

As another example, the first camera 104 may be configured to capture the third image 111 while the scene is under structured light illumination from the one or more first projectors 504. The processor 112 may be configured to determine whether the structured light pattern is detectable at the first keypoint 202 in the third image 111. The processor 112 may determine that the structured light pattern is detectable at the first keypoint 202 and may estimate a distance of the first keypoint 202 in the third image 111 based on the detected structured light pattern associated with the first keypoint 202 in the third image 111. As another example, the processor 112 may be configured to determine whether the structured light pattern is detectable at the second keypoint 204 in the third image 111. The processor 112 may determine that the structured light pattern is not detectable at the second keypoint 204.

As another example, the one or more second keypoints P2 (that are detectable in the second image 109 and the fourth image 113) may include multiple keypoints including a first keypoint 206, a second keypoint 208, and a third keypoint 210, and the device 102 may include one or more second projectors 508. The one or more second projectors 508 may be configured to project a structured light pattern, and the second camera 108 may be configured to capture the second image 109 while the scene is under structured light illumination from the one or more second projectors 508. The processor 112 may be configured to determine whether the structured light pattern is detectable at the first keypoint 206 in the second image 109. The processor 112 may determine that the structured light pattern is detectable at the first keypoint 206 and may estimate a distance of the first keypoint 206 in the second image 109 based on the detected structured light pattern associated with the first keypoint 202 in the second image 109. As another example, the processor 112 may determine that the structured light pattern is detectable at the second keypoint 208 and may estimate a distance of the second keypoint 208 in the second image 109 based on the detected structured light pattern associated with the second keypoint 208 in the second image 109. As another example, the processor 112 may be configured to determine whether the structured light pattern is detectable at the third keypoint 210 in the second image 109. The processor 112 may determine that the structured light pattern is not detectable at the third keypoint 210.

As another example, the one or more second projectors 508 may be configured to project a structured light pattern, and the second camera 108 may be configured to capture the fourth image 113 while the scene is under structured light illumination from the one or more second projectors 508. The processor 112 may be configured to determine whether the structured light pattern is detectable at the first keypoint 206 in the fourth image 113. The processor 112 may determine that the structured light pattern is detectable at the first keypoint 206 and may estimate a distance of the first keypoint 206 in the fourth image 113 based on the detected structured light pattern associated with the first keypoint 206 in the fourth image 113. As another example, the processor 112 may determine that the structured light pattern is not detectable at the second keypoint 208 in the fourth image 113. As another example, the processor 112 may be configured to determine whether the structured light pattern is detectable at the third keypoint 210 in the fourth image 113. The processor 112 may determine that the structured light pattern is not detectable at the third keypoint 210 in the fourth image 113.

The processor 112 may be configured to determine whether a keypoint satisfies the distance criterion 185 based on whether the structured light pattern is detectable and based on an estimated distance for the keypoint. To illustrate, the processor 112 may determine that the estimated distance of the first keypoint 202 is greater than or equal to a distance criterion 185 and may thus determine that the first keypoint 202 in the first image 107 satisfies the distance criterion 185. As another example, the processor 112 may determine that the second keypoint 204 in the first image 107 does not satisfy the distance criterion 185 based on the structured light pattern not being detectable at the second keypoint 204 in the first image 107. As another example, the processor 112 may determine that the estimated distances of the first keypoint 206 and the second keypoint 208 in the second image 109 is greater than or equal to a distance criterion 185 and may thus determine that the first keypoint 206 and the second keypoint 208 in the second image 109 satisfies the distance criterion 185. As another example, the processor 112 may determine that the third keypoint 210 in the second image 109 does not satisfy the distance criterion 185 based on the structured light pattern not being detectable at the third keypoint 210 in the second image 109. As another example, the processor 112 may determine that the estimated distance of the first keypoint 202 in the third image 111 is greater than or equal to a distance criterion 185 and may thus determine that the first keypoint 202 in the third image 111 satisfies the distance criterion 185. As another example, the processor 112 may determine that the second keypoint 204 in the third image 111 does not satisfy the distance criterion 185 based on the structured light pattern not being detectable at the second keypoint 204 in the third image 111. As another example, the processor 112 may determine that the estimated distance of the first keypoint 206 in the fourth image 113 is greater than equal to a distance criterion 185 and may thus determine that the first keypoint 206 in the fourth image 113 satisfies the distance criterion 185. As another example, the processor 112 may determine that the estimated distance of the second keypoint 208 in the fourth image 113 is less than a distance criterion 185 and may thus determine that the second keypoint 208 in the fourth image 113 does not satisfy the distance criterion 185. As another example, the processor 112 may determine that the third keypoint 210 in the fourth image 113 does not satisfy the distance criterion 185 based on the structured light pattern not being detectable at the third keypoint 210 in the fourth image 113.

In some examples, the processor 112 is configured to include a keypoint in the subset 181 based on the keypoint satisfying the distance criterion 185 at the first time, at the second time, or at both the first time and the second time. Alternatively or additionally, the processor 112 may be configured to include the keypoint in the subset 183 based on the keypoint not satisfying the distance criterion 185 at both the first time and the second time. For example, the processor 112 may include the first keypoint 202 in the subset 181 based on determining that the estimated distance of the first keypoint 202 in the first image 107 satisfies the distance criterion 185. The processor 112 may include the first keypoint 206 in the subset 181 based on determining that the estimated distance of the first keypoint 206 in the second image 109 satisfies the distance criterion 185. The processor 112 may include the second keypoint 208 in the subset 181 based on determining that the estimated distance of the second keypoint 208 in the second image 109 satisfies the distance criterion 185. The processor 112 may include the second keypoint 204 in the subset 183 based on determining that the keypoint 204 is not detectable in the first image 107 (and thus does not satisfy the distance criterion 185 at the first time) and is not detectable in the third image 111 (and thus does not satisfy the distance criterion 185 at the second time). The processor 112 may include the third keypoint 210 in the subset 183 based on determining that the third keypoint 210 is not detectable in the second image 109 (and thus does not satisfy the distance criterion 185 at the first time) and is not detectable in the fourth image 113 (and thus does not satisfy the distance criterion 185 at the second time).

Thus, in this example, the subset 181 includes the first keypoint 202, the first keypoint 206, and the second keypoint 208. Additionally or alternatively, in this example, the subset 183 includes the second keypoint 204 and the third keypoint 210. The keypoints included in the subset 181 may be used to determine the rotation 182 as described above with reference to FIG. 1. The keypoints in the subset 183 may be used to determine the translation 184 as described above with reference to FIG. 1.

In other examples, the processor 112 is configured to include a keypoint in the subset 181 based on the keypoint satisfying the distance criterion 185 at the first time and the second time. Additionally or alternatively, the processor 112 may be configured to include the keypoint in the subset 183 based on the keypoint not satisfying the distance criterion 185 at the first time, at the second time, or at the first time and the second time. For example, the processor 112 may include the first keypoint 202 in the subset 181 based on determining that the estimated distance of the first keypoint 202 in the first image 107 satisfies the distance criterion 185 and determining the estimated distance of the first keypoint 202 in the third image 111 satisfies the distance criterion 185. The processor 112 may include the first keypoint 206 in the subset 181 based on determining that the estimated distance of the first keypoint 206 in the second image 109 satisfies the distance criterion 185 and based on determining that the estimated distance of the first keypoint 206 in the fourth image 113 satisfies the distance criterion 185. The processor 112 may include the second keypoint 204 in the subset 183 based on determining that the keypoint 204 is not detectable in the first image 107 (and thus does not satisfy the distance criterion 185 at the first time) or based on determining that the keypoint 204 is not detectable in the third image 111 (and thus does not satisfy the distance criterion 185 at the second time). The processor 112 may include the second keypoint 208 in the subset 183 based on determining that the estimated distance of the second keypoint 208 in the fourth image 113 does not satisfy the distance criterion 185. The processor 112 may include the third keypoint 210 in the subset 183 based on determining that the third keypoint 210 is not detectable in the second image 109 (and thus does not satisfy the distance criterion 185 at the first time) or based on determining that the third keypoint 210 is not detectable in the fourth image 113 (and thus does not satisfy the distance criterion 185 at the second time).

Thus, in this example, the subset 181 includes the first keypoint 202 and the first keypoint 206, and the subset 183 includes the second keypoint 204, the second keypoint 208, and the third keypoint 210. The keypoints included in the subset 181 may be used to determine the rotation 182 as described above with reference to FIG. 1. The keypoints in the subset 183 may be used to determine the translation 184 as described above with reference to FIG. 1.

In some examples, the device 102 may use a different approach of the approaches described above with reference to FIGS. 2-5 to evaluate the one or more first keypoints P1 with respect to the distance criterion 185 than the approach the device 102 uses to evaluate the one or more second keypoints P2 with respect to the distance criterion 185.

For example, the second camera 108 may correspond to a stereo camera as described above with reference to FIG. 4 and the device 102 may include the projector 504. In this example, the device 102 does not include the projector 508 and the first camera 104 does not include the multiple image sensors 402 and 404 (e.g., the first camera 104 may include a single image sensor). In this example, the processor 112 is configured to evaluate the one or more second keypoints P2 with respect to the distance criterion 185 as described above with reference to FIG. 4 and is configured to evaluate the one or more first keypoints P1 with respect to the distance criterion 185 as described above with reference to FIG. 5.

In another example, the processor 112 may evaluate the one or more first keypoints P1 with respect to the distance criterion based on the relative sharpness as described above with reference to FIG. 3. In this example, the processor 112 may evaluate the one or more second keypoints P2 with respect to the distance criterion 185 based on whether the one or more second keypoints P2 are detectable with the second camera 108 focused at infinity or substantially infinity as described above with reference to FIG. 2.

Thus, the processor 112 may determine the subset 181 and 183 using a different approach for the one or more first keypoints P1 than the one or more second keypoints P2.

Figure 6:
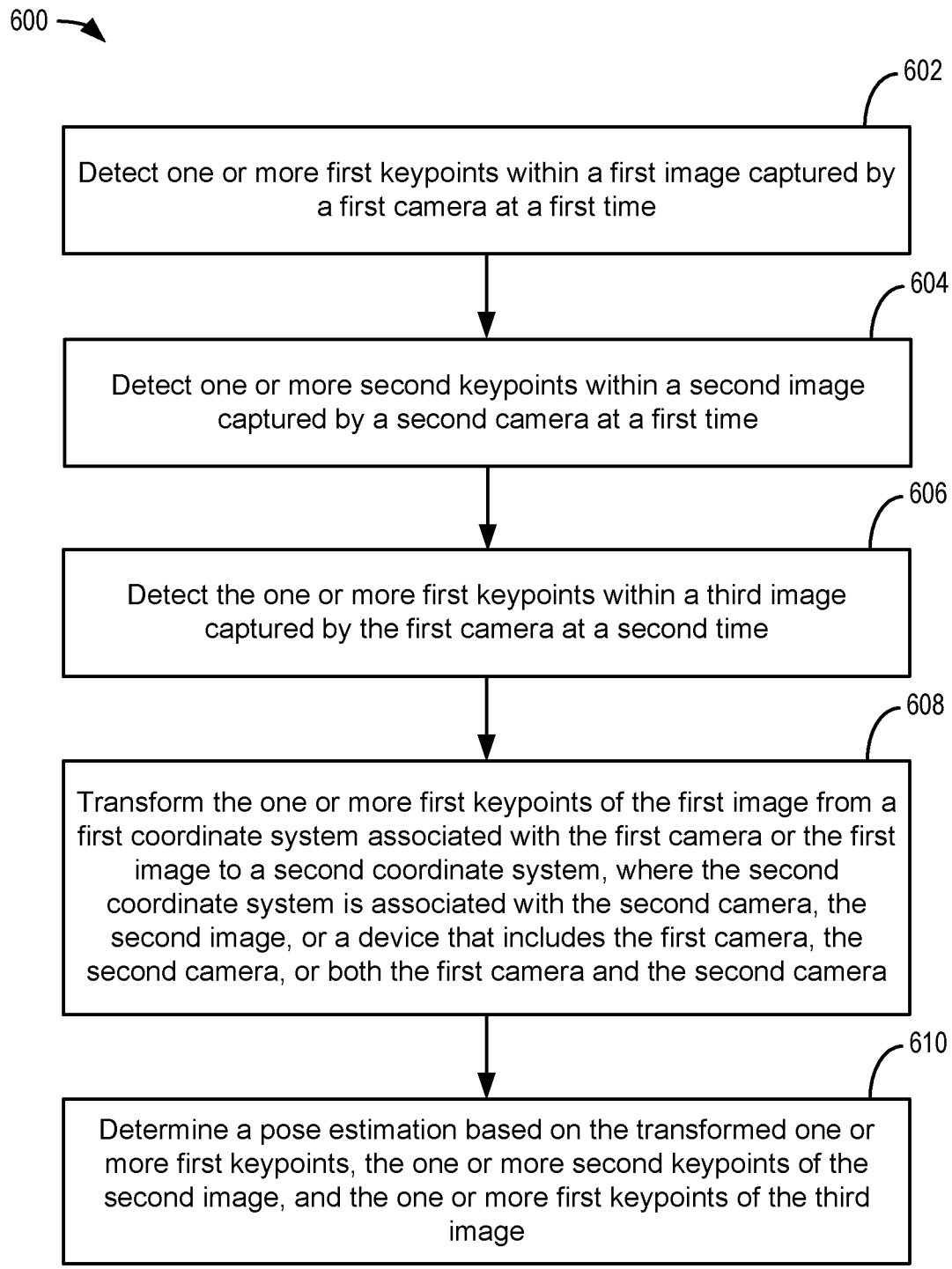
FIG. 6 is a flowchart of an example of a method of determining a pose estimation based on a first image of a first camera and based on a second image of a second camera.

FIG. 6 illustrates a flowchart of an example of a method 600 of determining a pose estimation based on movement of keypoints relative to a coordinate system associated with a second camera, a second image, or a device that includes a first camera and the second camera. The method 600 may be performed using the device 102 of FIG. 1.

The method 600 includes, at 602, detecting one or more first keypoints within a first image captured by a first camera at a first time. The one or more first keypoints may correspond to the one or more first keypoints P1 of FIG. 1, the first image may correspond to the first image 107 or FIG. 1, and the first camera may correspond to the first camera 104 of FIG. 1. The one or more first keypoints P1 may be detected by the processor 112 of FIG. 1 as described above with reference to FIG. 1.

The method 600 includes, at 604, detecting one or more second keypoints within a second image captured by a second camera at a first time. The one or more second keypoints may correspond to the one or more second keypoints P2 of FIG. 1, the second image may correspond to the second image 109 or FIG. 1, and the second camera may correspond to the second camera 108 of FIG. 1. The one or more second keypoints P2 may be detected by the processor 112 of FIG. 1 as described above with reference to FIG. 1. In some implementations, the one or more second keypoints P2 may be detected by the processor 112 within a fourth image captured by the second camera at the second time. For example, the one or more second keypoints P2 may be detected by the processor 112 within the fourth image 113 of FIG. 1 as described above with reference to FIG. 1.

The method 600 includes, at 606, detecting the one or more first keypoints within a third image captured by the first camera at a second time. For example, the one or more first keypoints P1 may be detected by the processor within the third image 111 of FIG. 1 as described above with reference to FIG. 1.

The method 600 includes, at 608, transforming the one or more first keypoints within the first image from a first coordinate system associated with the first camera or the first image to a second coordinate system. For example, the first coordinate system may correspond to the camera coordinate system 132 of FIG. 1, the image plane coordinate system 137 of FIG. 1, or the pixel coordinate system 135 of FIG. 1. The second coordinate system is associated with the second camera 108, the second image 109, or a device (e.g., the device 102) that includes the first camera 104, the second camera 108, or both the first camera 104 and the second camera 108. For example, the second coordinate system may correspond to the camera coordinate system 134 of FIG. 1, the image plane coordinate system 133 of FIG. 1, the pixel coordinate system 139 of FIG. 1, or the coordinate system 141 of FIG. 1. To illustrate, the one or more first keypoints in the first image may be transformed by transforming coordinates representing the one or more first keypoints P1 from the first coordinate system to the second coordinate system. For example, the transformed one or more first keypoints (associated with the first time) may correspond to the one or more first keypoints P1 as represented using the coordinates 136 of FIG. 1.

In some implementations, the method 600 includes transforming the one or more first keypoints within the third image from the first coordinate system to the second coordinate system to generate transformed one or more first keypoints associated with the second time. The one or more first keypoints within the third image may be transformed by transforming coordinates representing the one or more first keypoints P1 in the third image from the first coordinate system to the second coordinate system. For example, the transformed one or more first keypoints (associated with the second time) may correspond to the one or more first keypoints P1 as represented using the coordinates 138 of FIG. 1.

In some implementations, the second coordinate system corresponds to a coordinate system of the device that includes the first camera and the second camera. For example, the second coordinate system may correspond to the coordinate system 141. In these implementations, the method 600 additionally includes transforming the one or more second keypoints from a third coordinate system associated with the second camera or the second image to the coordinate system 141. For example, the third coordinate system associated with the second camera or the second image may correspond to the camera coordinate system 134, the image coordinate system 133, or the pixel coordinate system 139. In this example, the one or more second keypoints P2 may be transformed from the camera coordinate system 134, the image plane coordinate system 133, or the pixel coordinate system 139 to the coordinate system 141 by transforming the coordinates representing the one or more second keypoints P2 from the camera coordinate system 134, the image plane coordinate system 133, or the pixel coordinate system 139, to the coordinate system 141. To illustrate, transforming the one or more second keypoints P2 to the second coordinate system may correspond to transforming the coordinates 124 to the coordinates 154 as described above with reference to FIG. 1. As another example, transforming the one or more second keypoints to the second coordinate system may correspond to transforming the coordinates 128 to the coordinates 156 as described above with reference to FIG. 1.

The method 600 includes, at 610, determining a pose estimation based on the transformed one or more first keypoints, the one or more second keypoints of the second image, and the one or more first keypoints of the third image. The pose estimation may correspond to the pose estimation 178 described above with reference to FIG. 1. For example, the pose estimation may correspond to a particular pose estimation of the device 102 of FIG. 1.

For example, the pose estimation 178 may be determined based on the change 162 of the coordinates 136, 138 between the first time and the second time and the change 164 of the coordinates 124, 128 or 154, 156 between the first time and the second time as described above with reference to FIG. 1. For example, the coordinates 136 and 138 and the coordinates 124 and 128 may represent the one or more first keypoints P1 and the one or more second keypoints P2 in the pixel coordinate system 139, and the processor 112 may be configured to determine the change 162, 164 relative to the pixel coordinate system 139. As another example, the coordinates 136 and 138 and the coordinates 124 and 128 may represent the one or more first keypoints P1 and the one or more second keypoints P2 in the image plane coordinate system 133, and the processor 112 may be configured to determine the change 162, 164 relative to the image plane coordinate system 133. As another example, the coordinates 136 and 138 and the coordinates 124 and 128 may represent the one or more first keypoints P1 and the one or more second keypoints P2 in the camera coordinate system 134, and the processor 112 may be configured to determine the change 162, 164 relative to the camera coordinate system 134. As another example, the coordinates 136 and 138 and the coordinates 154 and 156 may represent the one or more first keypoints P1 and the one or more second keypoints P2 in the coordinate system 141, and the processor 112 may be configured to determine the change 162, 164 relative to the coordinate system 141.

The processor 112 may be configured to determine the pose estimation 178 by determining a "fundamental" matrix or "essential" matrix between the transformed one or more first keypoints P1 and the second keypoints P2 (as represented in the common coordinate system 133, 134, 139, or 141) or the transformed one or more second keypoints P2 at the first time and the one or more transformed first keypoints P1 and the transformed second keypoints P2 (as represented in the common coordinate system 133, 134, 139, or 141) at the second time based on the change 162 and 164. The processor 112 is configured to extract a rotation 182, a translation 184, or both, of the second camera 108 or the device 102 from the fundamental matrix or the essential matrix.

Determining the pose estimation 178 based on the one or more first keypoints P1 and the one or more second keypoints P2 relative to the common coordinate system 133, 134, 139, or 141 (e.g., relative to the same coordinate system) may enable solving for pose when the one or more second keypoints P2 from the second camera 108 are insufficient alone to solve for pose as described above with reference to FIG. 1.

In some implementations, the method 600 additionally includes capturing, by the first camera and the second camera, the first image and the second image. In some implementations, the method 600 additionally includes receiving, at a processor, the first image and the second image from the first camera and the second camera.

In some implementations, determining the pose estimation includes determining a subset of the one or more first keypoints P1 (of the first image, the third image, or another image captured by the first camera) and the one or more second keypoints P2 (of the second image, the fourth image, or another image captured by the second camera) that satisfy a distance criterion 185. For example, the method 600 may additionally include determining the subset 181 as described above. To illustrate, the method 600 may additionally include determining the subset based on detectability of the one or more first keypoints P1 and the one or more second keypoints when the first camera and the second camera are focused at infinity as described above with reference to FIGS. 1 and 2. As another example, the method 600 may additionally include determining the subset based on relative sharpness of the one or more first keypoints and the one or more second keypoints between image frames captured using different focus distances as described above with reference to FIGS. 1 and 3. As another example, the method 600 may additionally include determining the subset based on relative disparity of the keypoints in images captured by a stereo camera as described above with reference to FIGS. 1 and 4. As another example, the method 600 may additionally include determining the subset using a structured light system as described above with reference to FIGS. 1 and 5.

In implementations that include determining the subset, determining the pose estimation includes determining the rotation 182 based on the subset. In implementations that include determining the subset, determining the pose estimation includes determining the translation 184 based on a second subset of the one or more first keypoints (of the first image, the third image, or another image captured by the first camera) and the one or more second keypoints (of the second image, the fourth image, or another image captured by the second camera) that do not satisfy the distance criterion 185. Because perceived movement in distant keypoints is more representative of rotation movement than translation movement, using keypoints that satisfy the distance criterion 185 (e.g., using the subset 181) to solve for the rotation 182 may enable a more accurate determination of aspects of the perceived movement that are a product (result) of rotation.

Figure 7:
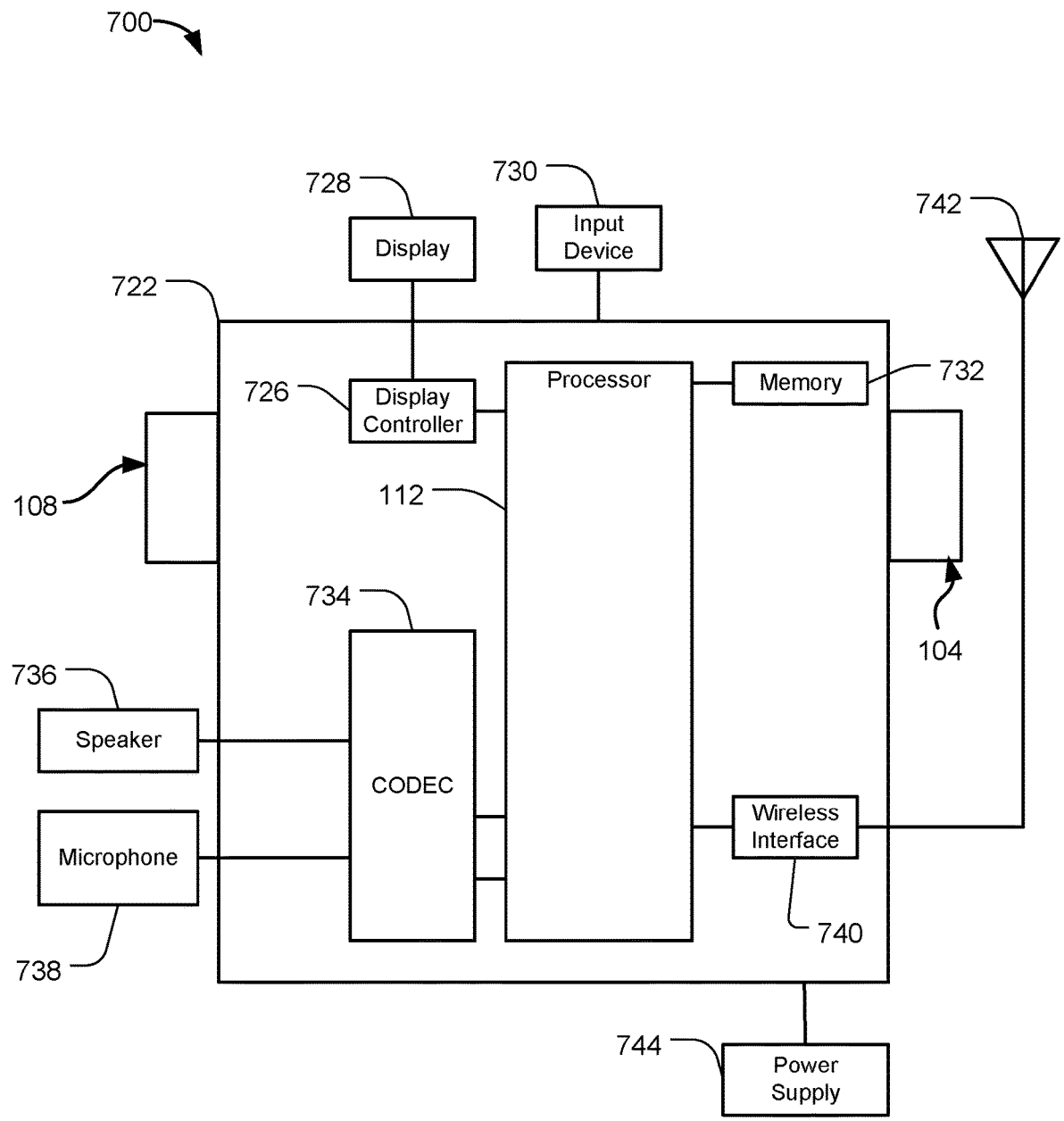
FIG. 7 is a block diagram of portable device including a processor configured to determine a pose estimation based a first image of a first camera and a second image of a second camera.

Referring to FIG. 7, a block diagram of a particular illustrative example of a wireless communication device is depicted and generally designated 700. The wireless communication device 700 includes a processor 112, such as a digital signal processor (DSP), coupled to a memory 732 (e.g., a random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art). In an illustrative example, the processor 112 may operate as described above with reference to FIG. 1, 2, 3, 4, or 5, according to the method of FIG. 6, or any combination thereof.

For example, the processor 112 may be configured to determine a pose estimation of the first camera 104, the second camera 108, or the device 102 based on keypoints from images captured by the first camera and different keypoints captured by the second camera in a single coordinate system as described above with reference to FIG. 1. Additionally, the processor 112 may be configured to determine the subset 181, the subset 183, or both, as described above with reference to FIGS. 1-6.

The device 700 the memory 732 may correspond to a computer-readable medium configured to store instructions that cause the processor 112 to perform one or more functions, operations, or tasks described above with reference to FIGS. 1-6. For example, the computer-readable instructions in the memory 732 may cause the processor 112 to perform the operation of detecting one or more first keypoints within a first image captured by a first camera at a first time. As another example, the computer-readable instructions in the memory 732 may cause the processor 112 to perform the operation of detecting one or more second keypoints within a second image captured from a second camera at the first time. As another example, the computer-readable instructions in the memory 732 may cause the processor 112 to perform the operation of detecting the one or more first keypoints within a third image captured from the first camera at a second time. As another example, the computer-readable instructions in the memory 732 may cause the processor 112 to perform the operation of transforming the one or more first keypoints from a first coordinate system associated with the first camera or the first image to a second coordinate system, where the second coordinate system is associated with the second camera, the second image, or a device that includes the first camera, the second camera, or both the first camera and the second camera. As another example, the computer-readable instructions in the memory 732 may cause the processor 112 to perform the operation of determining a pose estimation based on the transformed one or more first keypoints, the one or more second keypoints of the second image, and the one or more first keypoints of the third image.

In some examples, the second coordinate system corresponds to a coordinate system of the device (e.g., the device 102) that includes the first camera, the second camera, or both the first camera and the second camera. In these examples, the operations further comprise transforming the one or more second keypoints of the second image from a third coordinate system associated with the second camera or the second image to the second coordinate system to generate transformed one or more second keypoints. In these examples, the pose estimation is determined based on the transformed one or more first keypoints and the transformed one or more second keypoints and corresponds to a particular pose estimation of the device.

In some examples, determining the pose estimation includes determining a subset of the one or more first keypoints (of the first image, the third image, or another image captured by the first camera) and the one or more second keypoints (of the second image, the fourth image, or another image captured by the second camera) that satisfy a distance criterion 185. In some of these examples, determining the pose estimation includes determining the rotation 182 (e.g., of the second camera 108 or the device 102) between the first time and the second time based on the subset of the one or more first keypoints and the one or more second keypoints. Additionally or alternatively, determining the pose estimation may include determining the translation 184 (e.g., of the second camera 108 or the device 102) between the first time and the second time based on a second subset of the one or more first keypoints (of the first image, the third image, or another image captured by the first camera) and the one or more second keypoints (of the second image, the fourth image, or another image captured by the second camera) that do not satisfy the distance criterion 185.

FIG. 7 also shows a display controller 726 that is coupled to the processor 710 and to a display 728. A coder/decoder (CODEC) 734 may also be coupled to the processor 710. A speaker 736 and a microphone 738 may be coupled to the CODEC 734.

FIG. 7 also indicates that a wireless controller 740 may be coupled to the processor 710 and may be further coupled to an antenna 742. In a particular example, the processor 710, the display controller 726, the memory 732, the CODEC 734, and the wireless controller 740 are included in a system-in-package or system-on-chip device 722. In a particular example, an input device 730 and a power supply 744 are coupled to the system-on-chip device 722. Moreover, in a particular example, as illustrated in FIG. 7, the display 728, the input device 730, the speaker 736, the microphone 738, the antenna 742, and the power supply 744 are external to the system-on-chip device 722. However, each of the display 728, the input device 730, the speaker 736, the microphone 738, the antenna 742, and the power supply 744 may be coupled to a component of the system-on-chip device 722, such as an interface or a controller.

In conjunction with the described examples, a system or apparatus is disclosed that may include means for detecting one or more first keypoints within a first image captured at a first time by first means for capturing images, for detecting one or more second keypoints within a second image captured at the first time by second means for capturing images, and for detecting the one or more first keypoints within a third image captured at a second time by the first means for capturing images. The means for detecting the one or more first keypoints within a first image captured at a first time by first means for capturing images, for detecting one or more second keypoints within a second image captured at the first time by second means for capturing images, and for detecting the one or more first keypoints within a third image captured at a second time by the first means for capturing images may correspond to the processor 112 and an algorithm configured to detect the one or more first and second keypoints P1 and P2 as described above with reference to FIGS. 1 and 6. Additionally or alternatively, the means for detecting the one or more first keypoints within a first image captured at a first time by first means for capturing images, for detecting one or more second keypoints within a second image captured at the first time by second means for capturing images, and for detecting the one or more first keypoints within a third image captured at a second time by the first means for capturing images may correspond to circuitry configured to detect the one or more first and second keypoints P1 and P2 as described above with reference to FIGS. 1 and 6.

The system or apparatus additionally includes means for determining coordinates of the one or more first keypoints of the first image relative to a first coordinate system. The means for determining the coordinates of the one or more first keypoints may correspond to the processor 112 and an algorithm configured to determine the coordinates 122 or 126 as described above with reference to FIGS. 1 and 6. Additionally or alternatively, the means for determining the coordinates may correspond to circuitry configured to determine the coordinates 122 or 126 as described above with reference to FIGS. 1 and 6.

The system or apparatus additionally includes means for determining a pose estimation based on coordinates of the one or more first keypoints of the first image relative to a common coordinate system, coordinates of the one or more second keypoints of the second image relative to the common coordinate system, and coordinates of the one or more first keypoints of the third image relative to the common coordinate system. The common coordinate system is different than the first coordinate system. For example, the first coordinate system may correspond to the first coordinate system 132, 135, or 137, and the common coordinate system may correspond to the common coordinate system 133, 134, 139, or 141 as described above with reference to FIG. 1. The coordinates of the one or more first keypoints relative to the common coordinate system may correspond to the coordinates 136 or 138. The coordinates of the one or more second keypoints relative to the common coordinate system may correspond to the coordinates 124, 128, 154, or 156. The means for determining the pose estimation may correspond to the processor 112 and an algorithm configured to determine the pose estimation 178 as described above with reference to FIGS. 1, 2, 3, 4, 5, 6, 7, or a combination thereof. Alternatively or additionally, the means for determining the pose estimation may correspond to circuitry configured to determine the pose estimation 178 as described above with reference to FIGS. 1, 2, 3, 4, 5, 6, 7, or a combination thereof.

In some implementations, the apparatus or system further includes the means for capturing the first image, the means for capturing the second image, or both. The means for capturing the first image may correspond to the first camera 104 of FIG. 1 and the means for capturing the second image may correspond to the second camera 108 of FIG. 1.

In some implementations, the apparatus or system further includes a mobile communication device. In these implementations, the means for detecting the one or more first keypoints within the first image, the means for detecting the one or more second keypoints within the second image, the means for detecting the one or more first keypoints within the third image, and the means for determining the pose estimation are incorporated into the mobile communication device.

In some examples, the means for determining the pose estimation is further configured to determine a subset of the one or more first keypoints P1 (of the first image, the third image, or another image captured by the first camera) and the one or more second keypoints P2 (of the second image, the fourth image, or another image captured by the second camera) that satisfy a distance criterion 185. In some of these examples, to determine the pose estimation, the means for determining the pose estimation is configured to determine the rotation 182 based on the subset of the one or more first keypoints P1 and the one or more second keypoints P2. In some of these examples, to determine the pose estimation, the means for determining the pose estimation is configured to determine the translation 184 based on a second subset of the one or more first keypoints P1 (of the first image, the third image, or another image captured by the first camera) and the one or more second keypoints P2 (of the second image, the fourth image, or another image captured by the second camera) that do not satisfy the distance criterion 185. In some of these examples, the means for determining the pose estimation is configured to determine the subset based on relative disparities of the one or more first keypoints and the one or more second keypoints, based on whether the one or more first keypoints and the one or more second keypoints are detectable with the means for capturing the first image or the means for capturing the second image focused at infinity, based on a sharpness of the one or more first keypoints and the one or more second keypoints at different focus distances of the means for capturing the first image and the means for capturing the second image, or based on whether a structured light pattern is detectable at the one or more first keypoints and the one or more second keypoints as described above with reference to FIGS. 1-7.

Although one or more of FIGS. 1-7 may illustrate systems, devices, or methods according to the teachings of the disclosure, the disclosure is not limited to these illustrated systems, devices, or methods. Examples of the disclosure may be suitably employed in any device that includes integrated circuitry including memory, a processor, and on-chip circuitry.

One or more functions or components of any of FIGS. 1-7 as illustrated or described herein may be combined with one or more other portions of another of FIGS. 1-7. Accordingly, no single example described herein should be construed as limiting and examples of the disclosure may be suitably combined without departing form the teachings of the disclosure.

Those of skill would further appreciate that the various illustrative logical blocks, configurations, modules, circuits, and algorithm steps described in connection with the examples disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The means for performing a function and steps of a method or algorithm described in connection with the examples disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal. A storage device is not a signal.

The previous description of the disclosed examples is provided to enable a person skilled in the art to make or use the disclosed examples. Various modifications to these examples will be readily apparent to those skilled in the art, and the principles defined herein may be applied to other examples without departing from the scope of the disclosure. Thus, the present disclosure is not intended to be limited to the examples shown herein but is to be accorded the widest scope possible consistent with the principles and novel features as defined by the following claims.

What is claimed is:

1. A device comprising:
a first camera; and
a processor configured to:
   detect one or more first keypoints within a first image captured by the first camera at a first time;
   detect one or more second keypoints within a second image captured by a second camera at the first time;

detect the one or more first keypoints within a third image captured by the first camera at a second time;

determine coordinates of the one or more first keypoints of the first image relative to a first coordinate system; and determine a pose estimation based on the coordinates of the one or more first keypoints of the first image relative to a common coordinate system, based on coordinates of the one or more second keypoints of the second image relative to the common coordinate system, based on coordinates of the one or more first keypoints of the third image relative to the common coordinate system, and based on a translation of the second camera that is determined based on a subset of the one or more first keypoints and the one or more second keypoints that do not satisfy a distance criterion, wherein the first coordinate system is different than the common coordinate system.

2. The device of claim 1, further comprising the second camera, wherein the common coordinate system is associated with the second camera, the second image, or the device that includes the first camera.

3. The device of claim 1, wherein the common coordinate system corresponds to a camera coordinate system of the second camera, to an image coordinate system of the second camera, or to a pixel coordinate system of the second image, wherein the processor is further configured to transform the coordinates of the one or more first keypoints of the first image relative to the first coordinate system to the common coordinate system to generate the coordinates of the one or more first keypoints of the first image relative to the common coordinate system, and wherein the pose estimation corresponds to a pose estimation of the second camera.

4. The device of claim 3, wherein the processor is further configured to:

detect the one or more second keypoints within a fourth image captured from the second camera at the second time; and transform the one or more first keypoints of the third image from the first coordinate system to the common coordinate system to generate coordinates of the one or more first keypoints of the third image relative to the common coordinate system.

5. The device of claim 1, wherein the common coordinate system is associated with the device that includes the first camera, the second camera, or both the first camera and the second camera, wherein the processor is configured to:

transform the coordinates of the one or more first keypoints of the first image relative to the first coordinate system to the common coordinate system to generate the coordinates of the one or more first keypoints of the first image relative to the common coordinate system; and transform coordinates of the one or more second keypoints from a second coordinate system associated with the second camera or the second image to the common coordinate system to generate coordinates of the one or more second keypoints of the second image relative to the common coordinate system, wherein the pose estimation corresponds to a pose estimation of the device.

6. The device of claim 1, wherein the processor is further configured to determine a second subset of the one or more first keypoints of the first image and the one or more second keypoints of the second image that satisfy the distance criterion, and wherein the distance criterion is associated with a distance of the one or more first keypoints of the first image and the one or more second keypoints of the second image from the first camera, from the second camera, or from the device.

7. The device of claim 6, wherein, to determine the pose estimation, the processor is configured to determine a rotation of the second camera based on the second subset of the one or more first keypoints and the one or more second keypoints.

8. The device of claim 6, wherein the processor is configured to determine the second subset based on relative disparities of the one or more first keypoints and the one or more second keypoints, based on whether the one or more first keypoints and the one or more second keypoints are detectable with the first camera at a focal point of a lens of the first camera or with the second camera at a focal point of a lens of the second camera, based on a sharpness of the one or more first keypoints and the one or more second keypoints at different focus distances of the first camera and the second camera, or based on whether a structured light pattern is detectable at the one or more first keypoints and the one or more second keypoints.

9. The device of claim 1, wherein the one or more second keypoints are not present in the first image.

10. The device of claim 1, wherein the processor is further configured to determine a reconstruction of one or more objects in the first image, one or more objects in the second image, or both, based on the pose estimation.

11. A method of determining a pose estimation, the method comprising:

detecting one or more first keypoints within a first image captured by a first camera at a first time;

detecting one or more second keypoints within a second image captured from a second camera at the first time;

detecting the one or more first keypoints within a third image captured by the first camera at a second time;

transforming the one or more first keypoints of the first image from a first coordinate system associated with the first camera or associated with the first image to a second coordinate system to generate transformed one or more first keypoints, wherein the second coordinate system is associated with the second camera, the second image, or a device that includes the first camera, the second camera, or both the first camera and the second camera; and determining a pose estimation based on the transformed one or more first keypoints, the one or more second keypoints of the second image, the one or more first keypoints of the third image, and a translation of the second camera that is determined based on a subset of the one or more first keypoints and the one or more second keypoints that do not satisfy a distance criterion.

12. The method of claim 11, wherein the second coordinate system is associated with the device, and further comprising transforming the one or more second keypoints from a third coordinate system associated with the second camera or associated with the second image to the second coordinate system to generate transformed one or more second keypoints, wherein the pose estimation is further determined based on the transformed one or more second keypoints, and wherein the pose estimation corresponds to a pose estimation of the device.

13. The method of claim 11, wherein transforming the one or more first keypoints of the first image includes performing a rigid body transform.

14. The method of claim 11, wherein determining the pose estimation includes determining a second subset of the one or more first keypoints of the first image and the one or more second keypoints of the second image that satisfy the distance criterion.

15. The method of claim 14, wherein determining the pose estimation includes determining a rotation of the second camera based on the second subset of the one or more first keypoints and the one or more second keypoints.

16. The method of claim 11, wherein the one or more second keypoints of the second image are not present in the first image.

17. The method of claim 11, further comprising:
capturing, by the first camera and the second camera, the first image and the second image; and
receiving, at a processor of the device, the first image and the second image from the first camera and the second camera.

18. An apparatus comprising:
means for detecting one or more first keypoints within a first image captured at a first time by first means for capturing images, for detecting one or more second keypoints within a second image captured at the first time by second means for capturing images, and for detecting the one or more first keypoints within a third image captured at a second time by the first means for capturing images;
means for determining coordinates of the one or more first keypoints of the first image relative to a first coordinate system; and
means for determining a pose estimation based on coordinates of the one or more first keypoints of the first image relative to a common coordinate system, based on coordinates of the one or more second keypoints of the second image relative to the common coordinate system, based on coordinates of the one or more first keypoints of the third image relative to the common coordinate system, and based on a translation of the second means for capturing images that is determined based on a subset of the one or more first keypoints and the one or more second keypoints that do not satisfy a distance criterion, wherein the common coordinate system is different than the first coordinate system.

19. The apparatus of claim 18, wherein the common coordinate system is associated with the second means for capturing images, the second image, or a device that includes the first means for capturing images and the second means for capturing images.

20. The apparatus of claim 18, further comprising:
the first means for capturing images; and
the second means for capturing images.

21. The apparatus of claim 18, further comprising a mobile communication device, wherein the means for detecting the one or more first keypoints within the first image, the means for detecting the one or more second keypoints within the second image, the means for detecting the one or more first keypoints within the third image, the means for determining the coordinates of the one or more first keypoints of the first image relative to the first coordinate system, and the means for determining the pose estimation are incorporated into the mobile communication device.

22. The apparatus of claim 18, wherein, the means for determining the pose estimation is further configured to:
determine a second subset of the one or more first keypoints within the first image and the one or more second keypoints within the second image that satisfy the distance criterion; and
determine a rotation of the second means for capturing images based on the second subset of the one or more first keypoints and the one or more second keypoints.

23. The apparatus of claim 22, wherein the means for determining the pose estimation is configured to determine the second subset based on relative disparities of the one or more first keypoints and the one or more second keypoints, based on whether the one or more first keypoints and the one or more second keypoints are detectable with the first means for capturing images at a focal point of a lens of the first means for capturing images or with the second means for capturing images at a focal point of a lens of the second means for capturing images, based on a sharpness of the one or more first keypoints and the one or more second keypoints at different focus distances of the first means for capturing images and the second means for capturing images, or based on whether a structured light pattern is detectable at the one or more first keypoints and the one or more second keypoints.

24. A non-transitory computer-readable medium storing instructions that, when executed by a processor, cause the processor to perform operations comprising:
detecting one or more first keypoints within a first image captured by a first camera at a first time;
detecting one or more second keypoints within a second image captured from a second camera at the first time;
detecting the one or more first keypoints within a third image captured form the first camera at a second time;
transforming the one or more first keypoints from a first coordinate system associated with the first camera or the first image to a second coordinate system to generate transformed one or more first keypoints, wherein the second coordinate system is associated with the second camera, the second image, or a device that includes the first camera, the second camera, or both of the first camera and the second camera; and
determining a pose estimation based on the transformed one or more first keypoints, the one or more second keypoints of the second image, the one or more first keypoints of the third image, and a translation of the second camera that is determined based on a subset of the one or more first keypoints and the one or more second keypoints that do not satisfy a distance criterion.

25. The non-transitory computer-readable medium of claim 24, wherein the second coordinate system is associated with the device, and further comprising transforming the one or more second keypoints of the second image from a third coordinate system associated with the second camera or the second image to the second coordinate system to generate transformed one or more second keypoints, wherein the pose estimation is further determined based on the transformed one or more second keypoints, and wherein the pose estimation corresponds to a pose estimation of the device.

26. The non-transitory computer-readable medium of claim 24, wherein the second coordinate system is associated with the second camera or the second image.

27. The non-transitory computer-readable medium of claim 24, wherein determining the pose estimation includes:
determining a second subset of the one or more first keypoints of the first image and the one or more second keypoints of the second image that satisfy the distance criterion; and determining a rotation of the second camera based on the second subset of the one or more first keypoints and the one or more second keypoints.

\* \* \* \* \*